United States Patent
Tsai et al.

(10) Patent No.: US 8,605,367 B2
(45) Date of Patent: Dec. 10, 2013

(54) OPTICAL LENS ASSEMBLY FOR IMAGING PICKUP

(75) Inventors: Tsung-Han Tsai, Taichung (TW); Ming-Ta Chou, Taichung (TW)

(73) Assignee: Largan Precision Co., Taichung (TW)

( * ) Notice: Subject to any disclaimer, the term of this patent is extended or adjusted under 35 U.S.C. 154(b) by 0 days.

(21) Appl. No.: 13/407,318

(22) Filed: Feb. 28, 2012

(65) Prior Publication Data

US 2013/0033765 A1   Feb. 7, 2013

(30) Foreign Application Priority Data

Aug. 4, 2011   (TW) .............................. 100127758 A

(51) Int. Cl.
*G02B 13/18* (2006.01)
*G02B 13/04* (2006.01)
*G02B 9/60* (2006.01)

(52) U.S. Cl.
USPC ............................ 359/714; 359/753; 359/764

(58) Field of Classification Search
USPC .......................................... 359/714, 753, 764
See application file for complete search history.

(56) References Cited

U.S. PATENT DOCUMENTS

| | | | |
|---|---|---|---|
| 7,480,105 B2 | 1/2009 | Mori | |
| 7,502,181 B2 | 3/2009 | Shinohara | |
| 7,663,813 B2 | 2/2010 | Lai | |
| 2011/0310287 A1* | 12/2011 | Ohtsu | ............................ 348/340 |
| 2012/0081595 A1* | 4/2012 | Uchida | ........................ 348/340 |

* cited by examiner

*Primary Examiner* — Scott J Sugarman
*Assistant Examiner* — Daniele Manikeu
(74) *Attorney, Agent, or Firm* — Wang Law Firm, Inc.; Li K. Wang; Stephen Hsu

(57) ABSTRACT

An optical lens assembly for imaging pickup, sequentially arranged from an object side to an image side, comprising: a first lens element, a second lens element, a third lens element, a fourth lens element and a fifth lens element. The first lens element with positive refractive power has a convex object-side surface. The second lens element has negative refractive power. The third lens element with refractive power has bi-aspheric surfaces. The fourth lens element with positive refractive power has a concave object-side surface and a convex image-side surface and both being aspheric. The fifth lens element with negative refractive power has a concave image-side surface, bi-aspheric surfaces and at least one inflection point. Therefore, the optical lens assembly for imaging pickup satisfies conditions related to shorten the total length and to reduce the sensitivity for use in compact cameras and mobile phones with camera functionalities.

24 Claims, 17 Drawing Sheets

OPTICAL LENS ASSEMBLY FOR IMAGING PICKUP

BACKGROUND OF THE INVENTION

1. Field of the Invention

The present invention relates to an optical lens assembly for imaging pickup, and more particularly to the optical lens assembly for imaging pickup comprised of five lens elements to provide a good image quality and reduce the total length to satisfy the specifications for electronic products.

2. Description of the Related Art

Currently, a personal computer is generally equipped with a web camera, and a mobile phone camera has become a necessary item. To meet user requirements, compact electronic products such as web cameras, mobile phone cameras, and digital still cameras tend to be developed with a thin design, and an optical lens assembly for imaging pickup is generally installed for capturing images of an object, and the optical lens assembly for imaging pickup must be installed in the thin computer, mobile phone or camera, and thus the compact and thin optical lens assembly for imaging pickup has a high demand. As the pixel of the camera keeps increasing, the optical lens assembly for imaging pickup tends to be developed with smaller volume and thickness, while meeting the user requirements by improving the resolution, the telecentricity, and the optical performance of the aberration correction.

In general, a conventional optical lens assembly for imaging pickup of a compact electronic product comes with different designs, including the two-lens, three-lens, four-lens, and five-or-more lens designs. If the imaging quality is taken into consideration, the optical lens assembly for imaging pickup with the four-lens or five-lens designs has advantages on image aberration and modulation transfer function (MTF) performance, wherein the five-lens design having a higher resolution than the four-lens designs thus being applicable for electronic products requiring the high quality and high pixels.

In various compact designs of the five-lens optical lens assembly for imaging pickup having a fixed focal length, prior arts adopt different combinations of positive and negative refractive powers and a group of stacked lens elements as disclosed in publications and U.S. Pat. Nos. 7,663,813, in which the two cemented glass lenses incur a higher manufacturing cost, and such conventional optical lens assembly for imaging pickup is unfavorable for the cost control of mass production. Another conventional technique is the combination of a first lens element with negative refractive power and a second lens element with positive refractive power as disclosed in U.S. Pat. No. 7,480,105, but such conventional optical lens assembly for image pickup cannot reduce the total length of the optical system easily to meet the requirement of the compact design.

In products such as compact digital cameras, web cameras, and mobile phone cameras, the optical lens assembly for imaging pickup requires a compact design, a short focal length, and a good aberration correction. As disclosed in U.S. Pat. No. 7,502,181, a first lens element with positive refractive power, a second lens element with negative refractive power, and a fourth lens element with negative refractive power are installed to shorten the total length of the optically system. Since the fourth lens element has a convex object-side surface and a concave image-side surface, the aberration correction can be compensated, and the surface shapes of the fourth lens element and the fifth lens element have a large change and must be matched with each other, and such requirements are unfavorable for mass production. In the description above, the conventional designs will increase the back focal length and the total length of the optical lens assembly for imaging pickup. In various different designs of the five-lens focal length optical lens assembly for imaging pickup with a fixed focal length, a first lens element having a convex object-side surface is used for decreasing the refractive angle of the incident light to avoid an excessive aberration, so as to facilitate obtaining a good balance between the effects of increasing the view angle of the system and correcting the aberration. If the complementary combination of the fourth lens element with positive refractive power and the fifth lens element with negative refractive power is adopted, the telecentric effect can be improved to facilitate reducing the total length of the optical lens assembly for imaging pickup effectively. Therefore, the present invention provides a more practical design to shorten the optical lens assembly for imaging pickup, while using a combination of refractive powers and a combination of convex and concave surfaces of five lens elements to lower the cost for mass production easily and apply the optical lens assembly for imaging pickup to compact electronic products.

SUMMARY OF THE INVENTION

Therefore, it is a primary objective of the present invention to provide an optical lens assembly for imaging pickup, sequentially arranged from an object side to an image side along the optical axis, comprising: the first lens element, the second lens element, the third lens element, the fourth lens element and the fifth lens element; wherein the first lens element with positive refractive power has a convex object-side surface; the second lens element has negative refractive power; the third lens element with refractive power is made of plastic and has both aspheric object-side surface and image-side surface; the fourth lens element with positive refractive power is made of plastic and has a concave object-side surface and a convex image-side surface, and both object-side surface and image-side surface are aspheric; the fifth lens element with negative refractive power is made of plastic and has a concave image-side surface, and both object-side surface and image-side surface are aspheric, and at least one of the object-side surface and image-side surface has at least one inflection point, and the following relation is satisfied:

$$1.35 \text{ mm} < T_D < 1.85 \text{ mm}; \quad (1)$$

wherein, $T_D$ is the axial distance between the object-side surface of the first lens element and the image-side surface of the fifth lens element (as shown in FIG. 9).

On the other hand, the present invention provides an optical lens assembly for imaging pickup, as described above, and further comprises a stop; wherein the second lens element has a concave image-side surface, and the optical lens assembly for imaging pickup satisfies one or more of the following relations in addition to the relation (1):

$$0.85 < S_D/T_D < 1.15; \quad (2)$$

$$30 < v_1 - v_2 < 42; \quad (3)$$

$$|f/f_3| < 0.3; \quad (4)$$

$$0.2 < f_4/f < 0.65; \quad (5)$$

$$-0.65 < f_5/f < -0.2; \quad (6)$$

$$0.15 \text{ mm} < ET_3 < 0.25 \text{ mm}; \quad (7)$$

wherein, $S_D$ is the axial distance between the stop and the image-side surface of the fifth lens element, $T_D$ is the axial distance between the object-side surface of the first lens element and the image-side surface of the fifth lens element, $v_1$ is the Abbe number of the first lens element, $v_2$ is the Abbe number of the second lens element, f is the focal length of the optical lens assembly for imaging pickup, $f_3$ is the focal length of the third lens element, $f_4$ is the focal length of the fourth lens element, $f_5$ is the focal length of the fifth lens element, and $ET_3$ is the edge thickness of the third lens element at the maximum effective diameter (as shown in FIG. 9).

Another objective of the present invention is to provide an optical lens assembly for imaging pickup, sequentially arranged from an object side to an image side along the optical axis, comprising: the first lens element, the second lens element, the third lens element, the fourth lens element and the fifth lens element; wherein the first lens element with positive refractive power has a convex object-side surface; the second lens element has negative refractive power; the third lens element with refractive power is made of plastic and has both aspheric object-side surface and image-side surface; the fourth lens element with positive refractive power is made of plastic, and has a concave object-side surface and a convex image-side surface, and both object-side surface and image-side surface are aspheric; the fifth lens element with negative refractive power is made of plastic and has a concave image-side surface, and both object-side surface and image-side surface are aspheric, and at least one of the object-side surface and image-side surface has at least one inflection point, and the following relations are satisfied:

$$0.25 \text{ mm} < CT_{max} < 0.6 \text{ mm} \tag{8}$$

$$0.14 \text{ mm} < CT_{min} < 0.25 \text{ mm} \tag{9}$$

Wherein, $CT_{max}$ is the central thickness of the thickest lens element of the optical lens assembly for imaging pickup, and $CT_{min}$ is the central thickness of the thinnest lens element of the optical lens assembly for imaging pickup.

On the other hand, the present invention provides an optical lens assembly for imaging pickup, as described above, and further comprises a stop and an image plane, and the optical lens assembly for imaging pickup satisfies one or more of the following relations in addition to the relations (8) and (9):

$$0.2 < f_4/f < 0.65; \tag{5}$$

$$-0.65 < f_5/f < -0.2; \tag{6}$$

$$30 < v_1 - v_2 < 42; \tag{3}$$

$$0.85 < S_D/T_D < 1.15; \tag{2}$$

$$0.45 < CT_{min}/CT_{max} < 0.95; \tag{10}$$

$$0.15 \text{ mm} < ET_3 < 0.25 \text{ mm}; \tag{7}$$

$$1.7 \text{ mm} < (TTL/f)*T_D < 2.8 \text{ mm}; \tag{11}$$

wherein, f is the focal length of the optical lens assembly for imaging pickup, $f_4$ is the focal length of the fourth lens element, $f_5$ is the focal length of the fifth lens element, $v_1$ is the Abbe number of the first lens element, $v_2$ is the Abbe number of the second lens element, $S_D$ is the axial distance between the stop and the image-side surface of the fifth lens element, $T_D$ is the axial distance between the object-side surface of the first lens element and the image-side surface of the fifth lens element, $CT_{min}$ is the central thickness of the thinnest lens element of the optical lens assembly for imaging pickup, $CT_{max}$ is the central thickness of the thickest lens element of the optical lens assembly for imaging pickup, $ET_3$ is the edge thickness of the third lens element at the maximum effective diameter, and TTL is the axial distance between the object-side surface of the first lens element and the image plane.

Another objective of the present invention is to provide an optical lens assembly for imaging pickup, sequentially arranged from an object side to an image side along the optical axis, comprising: the first lens element, the second lens element, the third lens element, the fourth lens element and the fifth lens element, wherein the first lens element with positive refractive power has a convex object-side surface; the second lens element has negative refractive power; the third lens element with refractive power is made of plastic and has both aspheric object-side surface and image-side surface; the fourth lens element with positive refractive power is made of plastic and has a concave object-side surface and a convex image-side surface, and both object-side surface and image-side surface are aspheric; the fifth lens element with negative refractive power is made of plastic and has a concave image-side surface and both aspheric object-side surface and image-side surface, and at least one of the object-side surface and image-side surface has at least one inflection point, and the following relations are satisfied:

$$0.3 \text{ mm} < (CT_2 + CT_3) < 0.55 \text{ mm}; \tag{12}$$

$$1.15 \text{ mm} < \Sigma CT < 1.65 \text{ mm}; \tag{13}$$

wherein, $CT_2$ is the central thickness of the second lens element, $CT_3$ is the central thickness of the third lens element, and $\Sigma CT$ is the summation of the central thickness of each lens element of the optical lens assembly for imaging pickup.

On the other hand, the present invention provides an optical lens assembly for imaging pickup, as described above, and further comprises a stop, wherein the second lens element has a concave image-side surface, and the optical lens assembly for imaging pickup satisfies one or more of the following relations in addition to the relations (12) and (13):

$$0.85 < S_D/T_D < 1.15; \tag{2}$$

$$0.2 < f_4/f < 0.65; \tag{5}$$

$$-0.65 < f_5/f < -0.2; \tag{6}$$

$$30 < v_1 - v_2 < 42; \tag{3}$$

$$|f/f_3| < 0.3; \tag{4}$$

$$0.15 \text{ mm} < ET_3 < 0.25 \text{ mm}; \tag{7}$$

wherein, $S_D$ is the axial distance between the stop and the image-side surface of the fifth lens element, $T_D$ is the axial distance between the object-side surface of the first lens element and the image-side surface of the fifth lens element, f is the focal length of the optical lens assembly for imaging pickup, $f_3$ is the focal length of the third lens element, $f_4$ is the focal length of the fourth lens element, $f_5$ is the focal length of the fifth lens element, $v_1$ is the Abbe number of the first lens element, $v_2$ is the Abbe number of the second lens element, and $ET_3$ is the edge thickness of the third lens element at the maximum effective diameter.

Another objective of the present invention is to provide an optical lens assembly for imaging pickup, sequentially arranged from an object side to an image side along the optical axis, comprising: the first lens element, the second lens element, the third lens element, the fourth lens element and the fifth lens element; wherein the first lens element has positive refractive power; the second lens element has negative refractive power; the third lens element with refractive power is made of plastic and has both aspheric object-side surface and image-side surface; the fourth lens element with positive refractive power is made of plastic and has a concave object-side surface and a convex image-side surface, and both object-side surface and image-side surface are aspheric; the fifth lens element with negative refractive power is made of plastic and has both aspheric object-side surface and image-side surface, and at least one of object-side surface and image-side surface has at least one inflection point; and the optical lens assembly for imaging pickup further comprises an image plane, and the following relation is satisfied:

$$1.7 \text{ mm} < (TTL/f) * T_D < 2.8 \text{ mm}; \quad (11)$$

wherein TTL is the axial distance between the object-side surface of the first lens element and the image plane, f is the focal length of the optical lens assembly for imaging pickup, and $T_D$ is the axial distance between the object-side surface of the first lens element and the image-side surface of the fifth lens element.

On the other hand, the present invention provides an optical lens assembly for imaging pickup, as described above, and further comprises a stop, wherein the second lens element has a concave image-side surface, and the optical lens assembly for imaging pickup satisfies one or more of the following relations in addition to the relation (11):

$$0.85 < S_D/T_D < 1.15; \quad (2)$$

$$|f/f_3| < 0.3; \quad (4)$$

$$0.2 < f_4/f < 0.65; \quad (5)$$

$$-0.65 < f_5/f < -0.2; \quad (6)$$

$$0.45 < CT_{min}/CT_{max} < 0.95; \quad (10)$$

$$0.15 \text{ mm} < ET_3 < 0.25 \text{ mm}; \quad (7)$$

wherein, $S_D$ is the axial distance between the stop and the image-side surface of the fifth lens element, $T_D$ is the axial distance between the object-side surface of the first lens element and the image-side surface of the fifth lens element, f is the focal length of the optical lens assembly for imaging pickup, $f_3$ is the focal length of the third lens element, $f_4$ is the focal length of the fourth lens element, $f_5$ is the focal length of the fifth lens element, $CT_{min}$ is the central thickness of the thinnest lens element of the optical lens assembly for imaging pickup on the optical axis, $CT_{max}$ is the central thickness of the thickest lens element of the optical lens assembly for imaging pickup on the optical axis, and $ET_3$ is the edge thickness of the third lens element at the maximum effective diameter.

With the arrangement of the aforementioned first lens element, second lens element, third lens element, fourth lens element and fifth lens element with an appropriate interval apart from one another on the optical axis, the present invention can provide a good aberration correction and an advantageous modulation transfer function (MTF) in a greater field of view.

In the optical lens assembly for imaging pickup of the present invention comprised of the first lens element, second lens element, third lens element, fourth lens element and fifth lens element, the first lens element with positive refractive power provides most of the refractive power required by the system, and the second lens element with negative refractive power can correct aberrations produced by the positive refractive power effectively and correct the Petzval sum of the system to make the image surface on the edge flatter. If the second lens element has a concave image-side surface, the intensity of negative refractive power of the second lens element can be adjusted appropriately according to the surface shape to provide a good aberration correction effect to the system. If the fourth lens element has a concave object-side surface and a convex meniscus image-side surface, the aberration correction can be improved. If the curvature at the periphery of the image-side surface is greater than that at the center, the angle of projecting the light onto the sensor can be suppressed to enhance the light sensitivity of the image sensor. By having the complementary lens set of the fourth lens element with positive refractive power and the fifth lens element with negative refractive power, the telecentric effect can be achieved to reduce the back focal length, so as to shorten the total length. If the fifth lens element has a concave image-side surface, the principal point of the optical lens assembly for imaging pickup will be far away from the image plane to reduce the total length of the optical lens assembly for imaging pickup, so as to produce a compact design of a lens system.

In the optical lens assembly for imaging pickup of the present invention, the combination of the first lens element with positive refractive power, the second lens element with negative refractive power and the third lens element with positive or negative refractive power, and the mutual compensation of the fourth lens element with positive refractive power and the fifth lens element with negative refractive power can reduce the total length of the optical lens assembly for imaging pickup effectively, so that the image sensor can have a larger effective pixel range within the same total length. In other words, a shorter optical imaging system for pickup can be designed with the same effective pixel range of the image sensor.

If the fifth lens element has an inflection point, the inflection point can be used for guiding light of an image with an angle out from the edges of the fifth lens element, such that the light of an image at the off-axis view angle is guided and received by the image sensor. In addition, the third lens element, fourth lens element and fifth lens element are made of plastic to facilitate lower manufacture costs.

DETAILED DESCRIPTION OF THE PREFERRED EMBODIMENTS

Figure 1A:
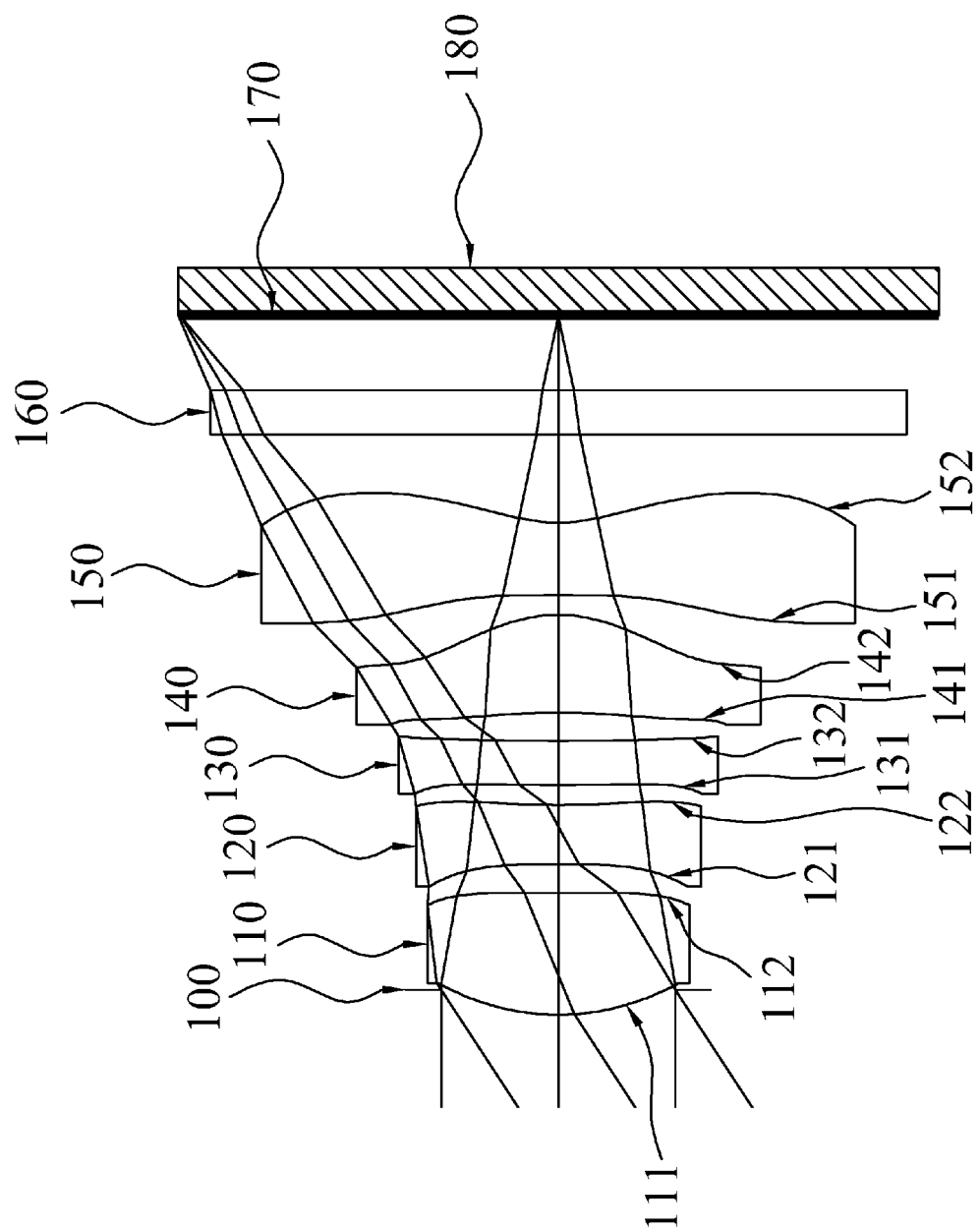
FIG. 1A is a schematic view of an optical lens assembly for imaging pickup in accordance with the first preferred embodiment of the present invention.

With reference to FIG. 1A for an optical lens assembly for imaging pickup of the present invention, the optical lens assembly for imaging pickup, sequentially arranged from an object side to an image side along the optical axis, comprises: the first lens element 110, the second lens element 120, the third lens element 130, the fourth lens element 140 and the fifth lens element 150; wherein, the first lens element 110 with positive refractive power has a convex object-side surface 111; the second lens element 120 has negative refractive power; the third lens element 130 with refractive power is made of plastic and has both aspheric object-side surface 131 and image-side surface 132; the fourth lens element 140 with positive refractive power is made of plastic, and has a concave object-side surface 141 and a convex image-side surface 142, and both object-side surface 141 and image-side surface 142 are aspheric; the fifth lens element 150 with negative refractive power is made of plastic and has a concave image-side surface 152, and both object-side surface 151 and image-side surface 152 are aspheric, and at least one of the object-side surface 151 and image-side surface 152 has at least one inflection point. The optical lens assembly for imaging pickup further comprises a stop and an IR-filter 160, the stop can be an aperture stop 100, which is a front aperture stop installed between a photographed object and the first lens element 110. The IR-filter 160 is installed between the fifth lens element 150 and the image plane 170 and generally made of panel glass without affecting the focal length of the optical lens assembly for imaging pickup of the present invention. The aspheric surfaces of the first lens element 110, second lens element 120, third lens element 130, fourth lens element 140 and fifth lens element 150 comply with the aspherical surface formula as given in Equation (14).

$$X(Y) = \frac{(Y^2/R)}{1+\sqrt{(1-(1+K)(Y/R)^2)}} + \sum_i (A_i)\cdot(Y^i) \qquad (14)$$

X is the relative height from a point on the aspherical surface with a distance Y between the optical axis and a tangent plane at the tip of the optical axis of the aspherical surface;

Y is the distance between a point on the curve of the aspherical surface and the optical axis;

R is the curvature radius;

K is the conic coefficient; and $A_i$ is the $i^{th}$ level aspherical surface coefficient.

In the optical lens assembly for imaging pickup of the present invention, the first lens element 110 and second lens element 120 have spheric or aspheric surfaces. If aspheric optical surfaces are adopted, then the curvature radius of the optical surfaces can be used for changing the refractive power to reduce or eliminate aberrations, so as to reduce the total length of the optical lens assembly for imaging pickup. With the arrangement of the first lens element 110, second lens element 120, third lens element 130, fourth lens element 140 and fifth lens element 150, the optical lens assembly for imaging pickup of the present invention satisfies the relation (1).

In the optical lens assembly for imaging pickup of the present invention, if the relation (1) is satisfied, the distance between the object-side surface 111 of the first lens element 110 and the image-side surface 152 of the fifth lens element 150 can be limited, so that the optical lens assembly for imaging pickup of the present invention can be installed into a thin digital camera, a mobile phone camera or a compact electronic device for different applications.

If the relations (2) and (11) are satisfied, the position of the aperture stop and the distance between the first lens element 110 and the image plane 170 can be adjusted to shorten the length of the optical lens assembly for imaging pickup. Similarly, if the relation (13) is satisfied, the allocation of thickness for each lens element and the length of the traveling light path of the optical lens assembly for imaging pickup can be limited to adjust the total length of the optical lens assembly for imaging pickup.

If the relations (8), (9) and (10) are satisfied, the thickness of each lens element of the optical lens assembly for imaging pickup can be adjusted appropriately. If the thickness of each lens element is excessive, it will be unfavorable to reduce the total length of the optical lens assembly for imaging pickup. If the thickness of each lens element is insufficient, the resolution of each lens element will be insufficient and unfavorable for the manufacture, and may lower the manufacturing yield rate. If the second lens element 120 and the third lens element 130 constitute a lens group with negative refractive power and the relation (12) is limited, the thickness of the second lens element 120 and third lens element 130 can be adjusted more appropriately to facilitate reducing the total length of the optical lens assembly for imaging pickup and limit the total length of the optical path of the lens group with negative refractive power and facilitate the aberration correction.

If the relations (5) and (6) are satisfied, the negative refractive power of the fourth lens element 140 can be adjusted appropriately to be complementary with the positive refractive power of the fifth lens element 150 to reduce the back focal length and shorten the total length. In the meantime, the refractive power of the fourth lens element 140 can be adjusted appropriated to be complementary with the refractive power of the fifth lens element 150 to produce the telecentric effect, so as to facilitate reduction of the back focal length and the total length and achieve the effect of a compact lens assembly. If the ratio of the focal length $f_3$ of the third lens element 130 to the focal length f of the optical lens assembly for imaging pickup is limited according to the relation (4), the refractive power of the third lens element 130 can be adjusted appropriately to assist reducing the sensitivity of the system in manufacturing tolerance. Similarly, if the relation (7) is satisfied, the thickness of the third lens element 130 at the maximum effective diameter can be adjusted appropriately to facilitate correcting high-level aberrations. If the effective diameter of the lens is undersized, the formation and manufacture of lenses may be affected by the stress at the periphery of the lens.

If the relation (3) is satisfied, meaning the difference between the Abbe number $v_1$ of the first lens element 110 and the Abbe number $v_2$ of the second lens element 120 will fall within a desirable range, the chromatic aberration produced by the first lens element 110 and the second lens element 120 can be improved by the chromatic aberration compensation ability of the second lens element 120.

The optical lens assembly for imaging pickup of the present invention is described by means of preferred embodiments with relevant drawings as follows.

<First Preferred Embodiment>

Figure 1B:
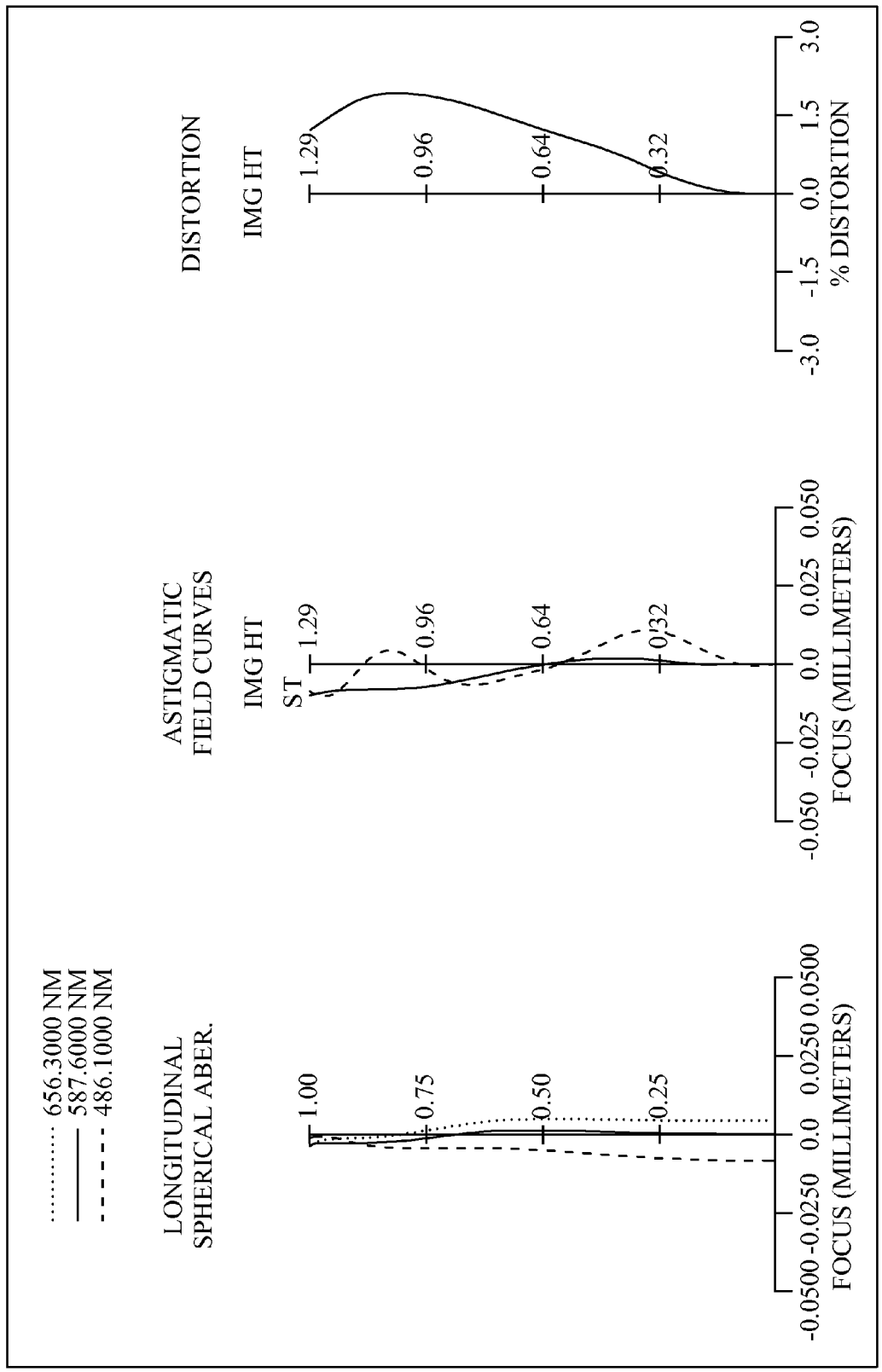
FIG. 1B is a schematic view of a series of aberration curves of the first preferred embodiment of the present invention.

With reference to FIGS. 1A and 1B for a schematic view and a series of aberration curves of an optical lens assembly for imaging pickup in accordance with the first preferred embodiment of the present invention respectively, the optical lens assembly for imaging pickup comprises five lens elements, an aperture stop 100 and an IR-filter 160. More specifically, the optical lens assembly for imaging pickup, sequentially arranged from an object side to an image side along an optical axis, comprises: an aperture stop 100; a plastic first lens element 110 with positive refractive power has a convex object-side surface 111 and a concave image-side surface 112, and both object-side surface 111 and image-side surface 112 are aspheric; a plastic second lens element 120 with negative refractive power has a concave object-side surface 121 and a concave image-side surface 122, and both object-side surface 121 and image-side surface 122 are aspheric; a plastic third lens element 130 with positive refractive power has a convex object-side surface 131 and a concave image-side surface 132, and both object-side surface 131 and image-side surface 132 are aspheric; a plastic fourth lens element 140 with positive refractive power has a concave object-side surface 141 and a convex image-side surface 142, and both object-side surface 141 and image-side surface 142 are aspheric; a plastic fifth lens element 150 with negative refractive power has a concave object-side surface 151 and a concave image-side surface 152, and both object-side surface 151 and image-side surface 152 being aspheric and having at least one inflection point; and an IR-filter 160 made of panel glass for adjusting a wavelength section of the light of an image, and an image sensor 180 at an image plane 170. With the combination of the five lens elements, the aperture stop 100 and the IR-filter 160, an image of the photographed object can be formed at the image sensor 180.

TABLE 1

Optical data of the first preferred embodiment
f = 1.95 mm, Fno = 2.45, HFOV = 33.1 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.085 | | | | |
| 2 | Lens 1 | 0.817270 (ASP) | 0.415 | Plastic | 1.544 | 55.9 | 1.52 |
| 3 | | 49.389600 (ASP) | 0.098 | | | | |
| 4 | | −3.877800 (ASP) | 0.200 | | | | |
|   | Lens 2 | | | Plastic | 1.640 | 23.3 | −2.52 |
| 5 | | 2.819460 (ASP) | 0.068 | | | | |
| 6 | | 7.181400 (ASP) | 0.150 | | | | |
|   | Lens 3 | | | Plastic | 1.640 | 23.3 | 42.67 |
| 7 | | 9.665200 (ASP) | 0.096 | | | | |
| 8 | | −2.486580 (ASP) | 0.332 | | | | |
|   | Lens 4 | | | Plastic | 1.544 | 55.9 | 1.03 |
| 9 | | −0.478880 (ASP) | 0.068 | | | | |
| 10 | | −28.944000 (ASP) | 0.246 | | | | |
|   | Lens 5 | | | Plastic | 1.544 | 55.9 | −0.95 |
| 11 | | 0.527170 (ASP) | 0.300 | | | | |
| 12 | | Plano | 0.150 | | | | |
|   | IR-filter | | | Glass | 1.517 | 64.2 | — |
| 13 | | Plano | 0.256 | | | | |
| 14 | Image | Plano | — | | | | |

Note:
Reference wavelength is 587.6 nm.
ASP stands for aspherical surfaces.

The optical data of this preferred embodiment are listed in Table 1, wherein the object-side surface and the image-side surface of the first lens element 110 to the fifth lens element 150 comply with the aspheric surface formula as given in Equation (14), and their aspheric coefficients are listed in Table 2 as follows:

TABLE 2

Aspheric coefficients of the first preferred embodiment

| Surface # | 2 | 3 | 4 | 5 | 6 |
|---|---|---|---|---|---|
| k = | −6.05423E−01 | −9.00000E+01 | 1.00000E+00 | 1.30522E+01 | −9.45481E+01 |
| A4 = | 1.36140E−01 | −4.35758E−01 | −9.19134E−01 | −3.78594E−01 | −1.98347E−01 |
| A6 = | −7.07686E−01 | −5.33285E+00 | −5.61501E+00 | −3.54949E+00 | −1.81387E+00 |
| A8 = | 5.80931E+00 | 2.06193E+01 | 1.16727E+01 | 4.47368E+00 | −4.64537E−01 |
| A10 = | −2.77749E+01 | −9.01758E+01 | 2.32341E+01 | −8.57924E+00 | −7.56697E+00 |

TABLE 2-continued

Aspheric coefficients of the first preferred embodiment

| A12 = | −2.53399E+00 | 1.56329E+02 | 4.80669E+00 | 4.78919E+01 | −1.56873E+01 |
|---|---|---|---|---|---|
| Surface # | 7 | 8 | 9 | 10 | 11 |
| k = | −2.05928E+01 | 1.71842E+01 | −3.47967E+00 | 1.00000E+00 | −6.95909E+00 |
| A4 = | −8.81152E−02 | 3.60394E−01 | −4.41190E−01 | −1.89181E+00 | −1.23167E+00 |
| A6 = | 1.75128E−02 | 1.31573E−01 | 1.37246E+00 | 7.81394E+00 | 3.76627E+00 |
| A8 = | 8.09954E−01 | 4.16438E+01 | 1.82902E+01 | −1.80567E+01 | −8.55285E+00 |
| A10 = | 1.34002E+00 | −3.91414E+02 | −4.67553E+01 | 2.79127E+01 | 1.28054E+01 |
| A12 = | −1.38496E+00 | 1.70196E+03 | −3.16176E+01 | −2.76148E+01 | −1.21190E+01 |
| A14 = | | −3.78207E+03 | 1.77929E+02 | 1.54604E+01 | 6.46678E+00 |
| A16 = | | | −1.35174E+02 | −3.75647E+00 | −1.47016E+00 |

With reference to Table 1 and FIG. 1B for an optical lens assembly for imaging pickup of this preferred embodiment, the optical lens assembly for imaging pickup has a focal length f=1.95 (mm), an f-number Fno=2.45, and a half of the maximum view angle HFOV=33.1°. After the optical data of this preferred embodiment are calculated and derived, the optical imaging system for pickup satisfies related conditions as shown in Table 3 below, and the related symbols have been described above and thus will not be described again.

TABLE 3

Data of related relations of the first preferred embodiment

| Relation | Data |
|---|---|
| $v_1 − v_2$ | 32.6 |
| $(CT_2 + CT_3)$ [mm] | 0.35 |
| $CT_{min}$ [mm] | 0.15 |
| $CT_{max}$ [mm] | 0.42 |
| $CT_{min}/CT_{max}$ | 0.36 |
| $\Sigma CT$ [mm] | 1.34 |
| $ET_3$ [mm] | 0.20 |
| $T_D$ [mm] | 1.67 |
| $(TTL/f)*T_D$ [mm] | 2.00 |
| $|f/f_3|$ | 0.05 |
| $f_4/f$ | 0.53 |
| $f_5/f$ | −0.49 |
| $S_D/T_D$ | 0.95 |

According to the optical data as shown in Table 1 and the series of aberration curves as shown in FIG. 1B, the optical lens assembly for imaging pickup in accordance with this preferred embodiment of the present invention provides good correction results in aspects of the longitudinal spherical aberration, astigmatic field curving, and distortion.

<Second Preferred Embodiment>

Figure 2A:
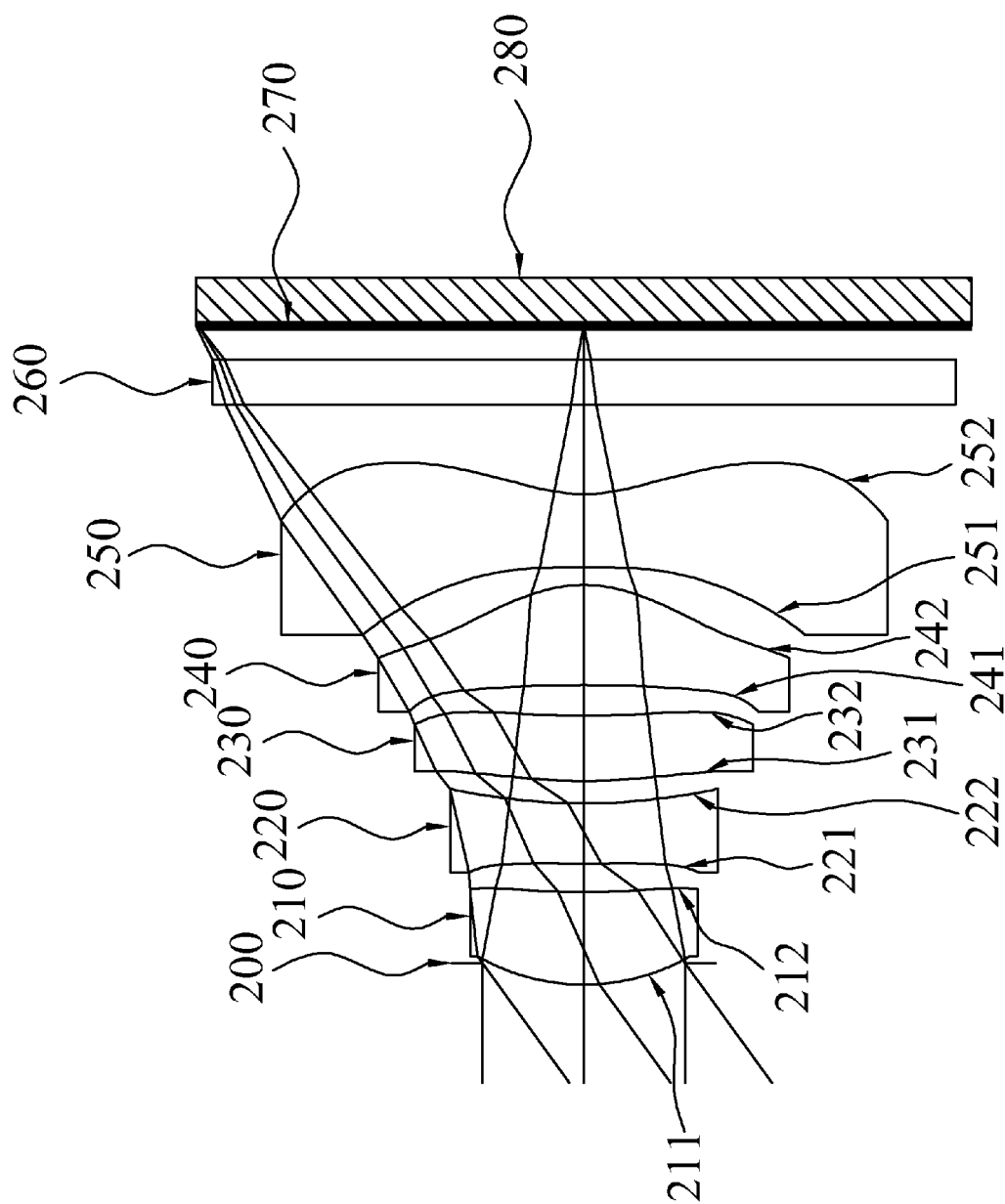
FIG. 2A is a schematic view of an optical lens assembly for imaging pickup in accordance with the second preferred embodiment of the present invention.
Figure 2B:
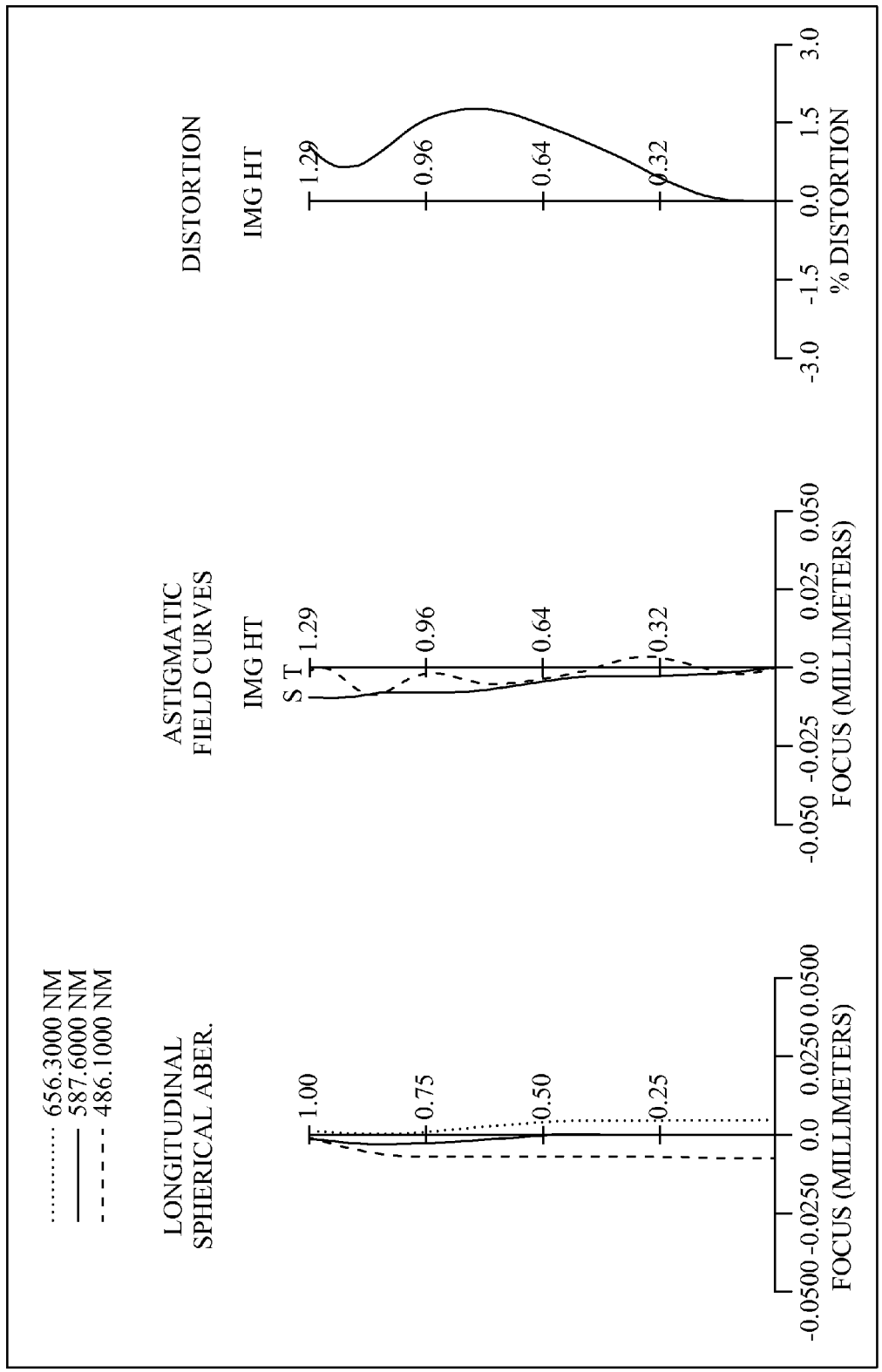
FIG. 2B is a schematic view of a series of aberration curves of the second preferred embodiment of the present invention.

With reference to FIGS. 2A and 2B for a schematic view and a series of aberration curves of an optical lens assembly for imaging pickup in accordance with the second preferred embodiment of the present invention respectively, the optical lens assembly for imaging pickup comprises five lens elements, an aperture stop 200 and an IR-filter 260. More specifically, the optical lens assembly for imaging pickup, sequentially arranged from an object side to an image side along an optical axis, comprises: an aperture stop 200; a plastic first lens element 210 with positive refractive power has a convex object-side surface 211 and a concave image-side surface 212, and both object-side surface 211 and image-side surface 212 are aspheric; a plastic second lens element 220 with negative refractive power has a convex object-side surface 221 and a concave image-side surface 222, and both object-side surface 221 and image-side surface 222 are aspheric; a plastic third lens element 230 with positive refractive power has a convex object-side surface 231 and a concave image-side surface 232, and both object-side surface 231 and image-side surface 232 are aspheric; a plastic fourth lens element 240 with positive refractive power has a concave object-side surface 241 and a convex image-side surface 242, and both object-side surface 241 and image-side surface 242 are aspheric; a plastic fifth lens element 250 with negative refractive power has a concave object-side surface 251 and a concave image-side surface 252, and both object-side surface 251 and image-side surface 252 are aspheric, and having at least one inflection point; and an IR-filter 260 made of panel glass for adjusting a wavelength section of the light of an image, and an image sensor 280 at an image plane 270. With the combination of the five lens elements, the aperture stop 200 and the IR-filter 260, an image of the photographed object can be formed at the image sensor 280.

TABLE 4

Optical data of the second preferred embodiment
f = 1.76 mm, Fno = 2.60, HFOV = 35.9 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.072 | | | | |
| 2 | | 0.715040 (ASP) | 0.309 | | | | |
| | Lens 1 | | | Plastic | 1.544 | 55.9 | 1.73 |
| 3 | | 2.534120 (ASP) | 0.096 | | | | |
| 4 | | 13.601700 (ASP) | 0.200 | | | | |
| | Lens 2 | | | Plastic | 1.650 | 21.4 | −3.20 |
| 5 | | 1.793450 (ASP) | 0.076 | | | | |
| 6 | | 1.914760 (ASP) | 0.217 | | | | |
| | Lens 3 | | | Plastic | 1.544 | 55.9 | 10.26 |
| 7 | | 2.798170 (ASP) | 0.103 | | | | |

TABLE 4-continued

Optical data of the second preferred embodiment
f = 1.76 mm, Fno = 2.60, HFOV = 35.9 deg.

| Surface # | | Curvature Radius | Thickness | Material | Index | Abbe # | Focal length |
|---|---|---|---|---|---|---|---|
| 8 | | −4.219700 (ASP) | 0.333 | | | | |
| | Lens 4 | | | Plastic | 1.544 | 55.9 | 0.92 |
| 9 | | −0.459100 (ASP) | 0.061 | | | | |
| 10 | | −4.653700 (ASP) | 0.242 | | | | |
| | Lens 5 | | | Plastic | 1.544 | 55.9 | −0.81 |
| 11 | | 0.495410 (ASP) | 0.300 | | | | |
| 12 | | Plano | 0.150 | | | | |
| | IR-filter | | | Glass | 1.517 | 64.2 | — |
| 13 | | Plano | 0.114 | | | | |
| 14 | Image | Plano | — | | | | |

Note:
Reference wavelength is 587.6 nm.
ASP stands for aspherical surfaces.

The optical data of this preferred embodiment are listed in Table 4, wherein the object-side surface and the image-side surface of the first lens element 210 to the fifth lens element 250 comply with the aspheric surface formula as given in Equation (14), and their aspheric coefficients are listed in Table 5 as follows:

TABLE 5

Aspheric coefficients of the second preferred embodiment

| Surface # | 2 | 3 | 4 | 5 | 6 |
|---|---|---|---|---|---|
| k = | −3.90831E−01 | −8.10621E−01 | −1.00000E+00 | 1.20734E+01 | −1.78209E+01 |
| A4 = | 1.99011E−01 | −2.19240E−01 | −8.57474E−01 | −5.60164E−01 | −2.44431E−01 |
| A6 = | 4.00621E−02 | −4.74201E+00 | −4.50327E+00 | −1.16760E+00 | −8.98074E−01 |
| A8 = | 4.05372E+00 | 1.96129E+01 | 3.47698E+00 | 2.31980E+00 | 4.09306E+00 |
| A10 = | −2.40936E+01 | −1.42361E+02 | −4.21379E+01 | | 2.43292E−01 |
| A12 = | | | −1.24678E+02 | | −3.55733E+01 |

| Surface # | 7 | 8 | 9 | 10 | 11 |
|---|---|---|---|---|---|
| k = | −5.67322E+01 | 6.82703E+00 | −3.41790E+00 | 1.00000E+00 | −6.63375E+00 |
| A4 = | −2.11372E−01 | −4.98077E−02 | −4.97269E−01 | −1.99620E+00 | −1.21480E+00 |
| A6 = | −7.92798E−01 | −7.79685E−01 | 6.54339E−01 | 7.48071E+00 | 3.66648E+00 |
| A8 = | −3.48165E+00 | 4.17968E+01 | 1.81022E+01 | −1.81622E+01 | −8.51217E+00 |
| A10 = | −1.51847E+00 | −3.99807E+02 | −4.59463E+01 | 2.79065E+01 | 1.27942E+01 |
| A12 = | 1.63578E+01 | 1.69240E+03 | −2.99691E+01 | −2.74950E+01 | −1.21575E+01 |
| A14 = | | −3.76135E+03 | 1.79300E+02 | 1.56818E+01 | 6.45074E+00 |
| A16 = | | 3.40479E+03 | −1.37145E+02 | −3.68832E+00 | −1.44222E+00 |

With reference to Table 4 and FIG. 2B for an optical lens assembly for imaging pickup of this preferred embodiment, the optical lens assembly for imaging pickup has a focal length f=1.76 (mm), an f-number Fno=2.60, and a half of the maximum view angle HFOV=35.9°. After the optical data of this preferred embodiment are calculated and derived, the optical imaging system for pickup satisfies related conditions as shown in Table 6 below, and the related symbols have been described above and thus will not be described again.

TABLE 6

Data of related relations of the second preferred embodiment

| Relation | Data |
|---|---|
| $v_1 - v_2$ | 34.5 |
| $(CT_2 + CT_3)$ [mm] | 0.42 |
| $CT_{min}$ [mm] | 0.20 |
| $CT_{max}$ [mm] | 0.33 |
| $CT_{min}/CT_{max}$ | 0.60 |

TABLE 6-continued

Data of related relations of the second preferred embodiment

| Relation | Data |
|---|---|
| $\Sigma CT$ [mm] | 1.30 |
| $ET_3$ [mm] | 0.16 |
| $T_D$ [mm] | 1.64 |
| $(TTL/f)*T_D$ [mm] | 2.00 |
| $|f/f_3|$ | 0.17 |
| $f_4/f$ | 0.52 |
| $f_5/f$ | −0.46 |
| $S_D/T_D$ | 0.96 |

According to the optical data as shown in Table 4 and the series of aberration curves as shown in FIG. 2B, the optical lens assembly for imaging pickup in accordance with this preferred embodiment of the present invention provides good correction results in aspects of the longitudinal spherical aberration, astigmatic field curving, and distortion.

<Third Preferred Embodiment>

Figure 3A:
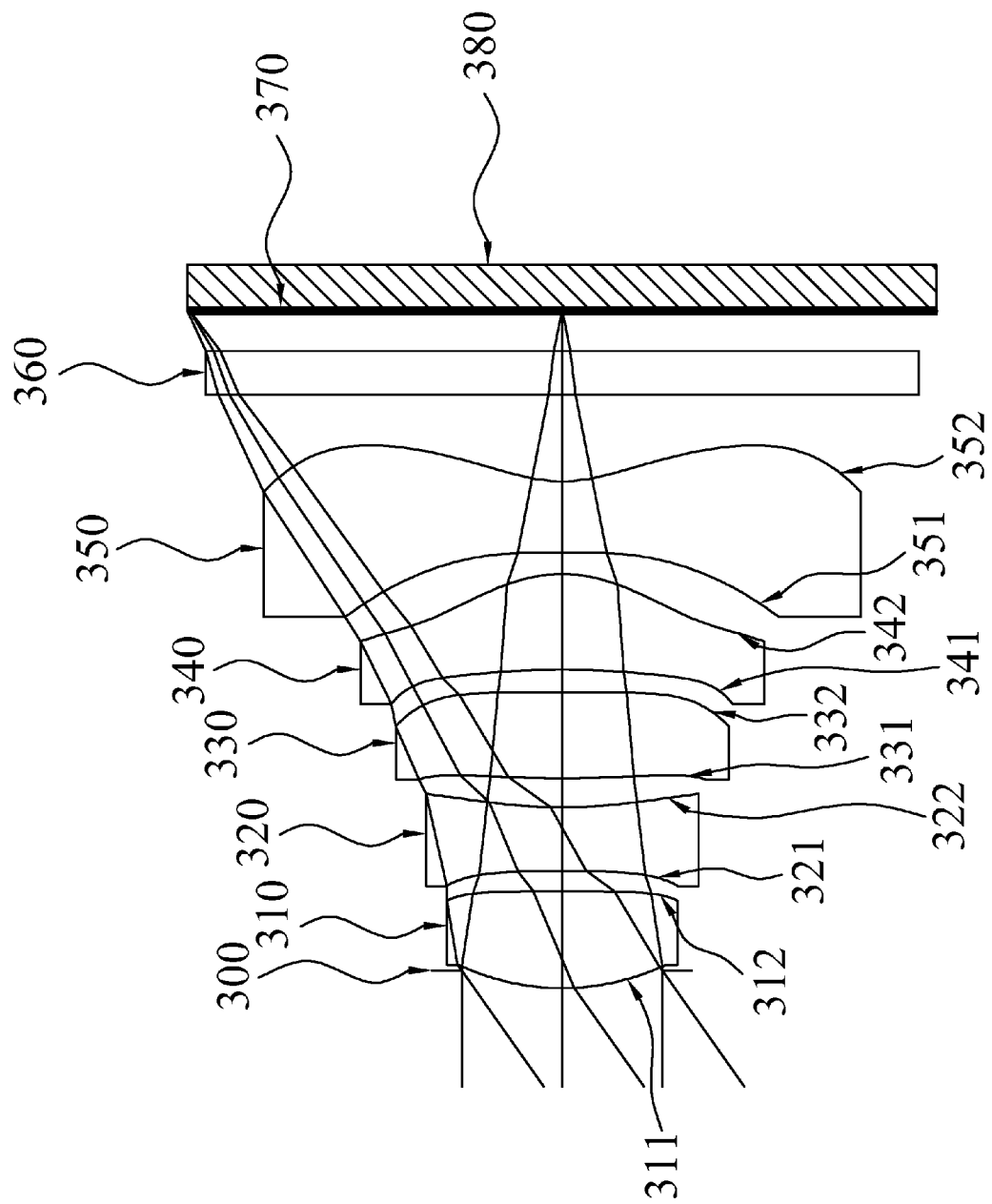
FIG. 3A is a schematic view of an optical lens assembly for imaging pickup in accordance with the third preferred embodiment of the present invention.
Figure 3B:
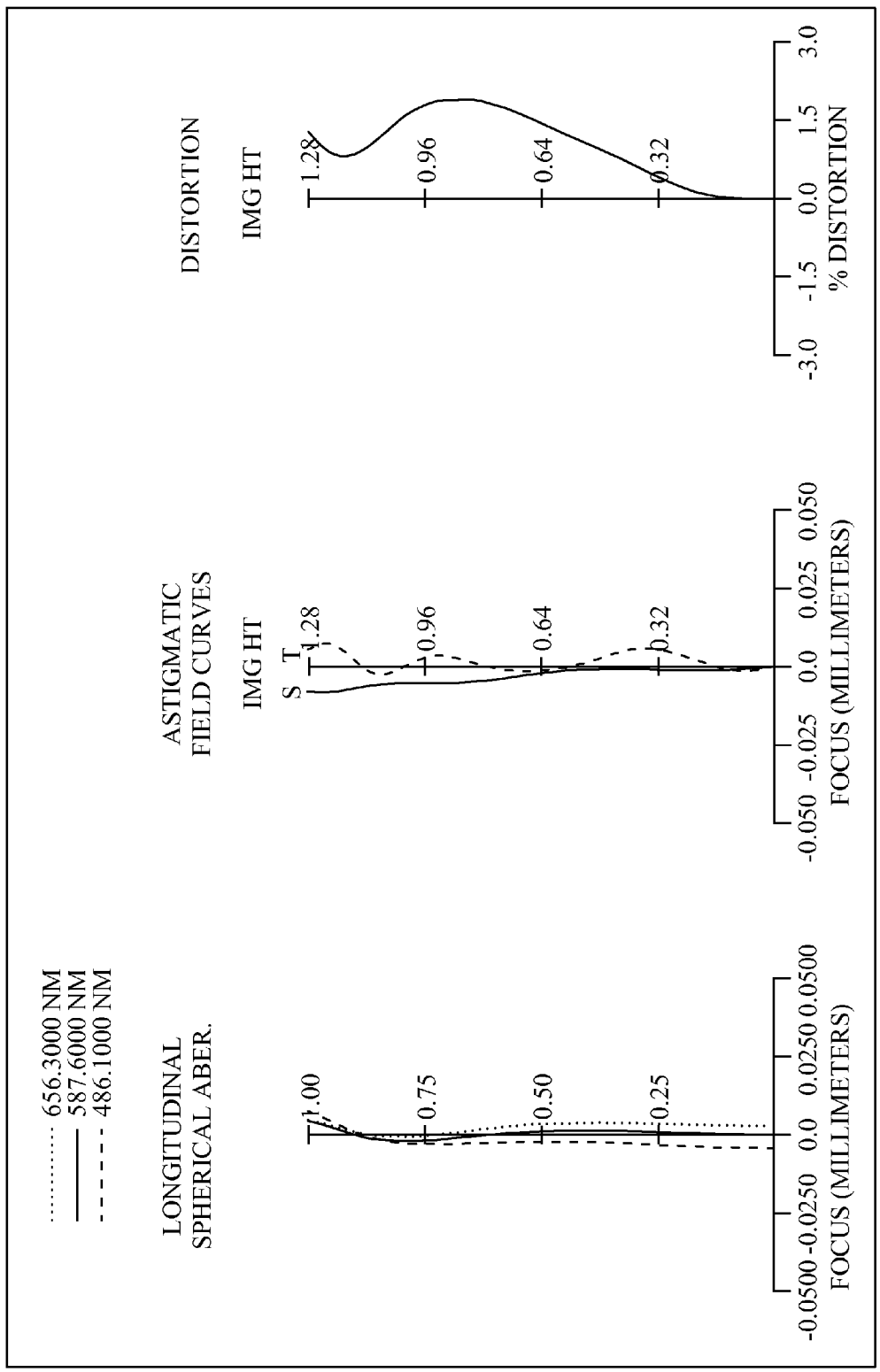
FIG. 3B is a schematic view of a series of aberration curves of the third preferred embodiment of the present invention.

With reference to FIGS. 3A and 3B for a schematic view and a series of aberration curves of an optical lens assembly for imaging pickup in accordance with the third preferred embodiment of the present invention respectively, the optical lens assembly for imaging pickup comprises five lens elements, an aperture stop 300 and an IR-filter 360. More specifically, the optical lens assembly for imaging pickup, sequentially arranged from an object side to an image side along an optical axis, comprises: an aperture stop 300; a plastic first lens element 310 with positive refractive power has a convex object-side surface 311 and a convex image-side surface 312, and both object-side surface 311 and image-side surface 312 are aspheric; a plastic second lens element 320 with negative refractive power has a concave object-side surface 321 and a concave image-side surface 322, and both object-side surface 321 and image-side surface 322 are aspheric; a plastic third lens element 330 with positive refractive power has a convex object-side surface 331 and a convex image-side surface 332, and both object-side surface 331 and image-side surface 332 are aspheric; a plastic fourth lens element 340 with positive refractive power has a concave object-side surface 341 and a convex image-side surface 342, and both object-side surface 341 and image-side surface 342 being aspheric; a plastic fifth lens element 350 with negative refractive power has a concave object-side surface 351 and a concave image-side surface 352, and both object-side surface 351 and image-side surface 352 are aspheric and having at least one inflection point; and an IR-filter 360 made of panel glass for adjusting a wavelength section of the light of an image, and an image sensor 380 at an image plane 370. With the combination of the five lens elements, the aperture stop 300 and the IR-filter 360, an image of the photographed object can be formed at the image sensor 380.

TABLE 7

Optical data of the third preferred embodiment
f = 1.80 mm, Fno = 2.60, HFOV = 35.2 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.060 | | | | |
| 2 | | 0.834980 (ASP) | 0.335 | | | | |
| | Lens 1 | | | Plastic | 1.544 | 55.9 | 1.48 |
| 3 | | −21.350700 (ASP) | 0.070 | | | | |
| 4 | | −5.927100 (ASP) | 0.220 | | | | |
| | Lens 2 | | | Plastic | 1.634 | 23.8 | −2.16 |
| 5 | | 1.804120 (ASP) | 0.100 | | | | |
| 6 | | 3.783700 (ASP) | 0.298 | | | | |
| | Lens 3 | | | Plastic | 1.544 | 55.9 | 5.81 |
| 7 | | −18.615000 (ASP) | 0.077 | | | | |
| 8 | | −2.688870 (ASP) | 0.330 | | | | |
| | Lens 4 | | | Plastic | 1.544 | 55.9 | 0.98 |
| 9 | | −0.462560 (ASP) | 0.075 | | | | |
| 10 | | −6.361800 (ASP) | 0.245 | | | | |
| | Lens 5 | | | Plastic | 1.535 | 56.3 | −0.81 |
| 11 | | 0.471550 (ASP) | 0.300 | | | | |
| 12 | | Plano | 0.150 | | | | |
| | IR-filter | | | Glass | 1.517 | 64.2 | — |
| 13 | | Plano | 0.138 | | | | |
| 14 | Image | Plano | — | | | | |

Note:
Reference wavelength is 587.6 nm.
ASP stands for aspherical surfaces.

The optical data of this preferred embodiment are listed in Table 7, wherein the object-side surface and the image-side surface of the first lens element 310 to the fifth lens element 350 comply with the aspheric surface formula as given in Equation (14), and their aspheric coefficients are listed in Table 8 as follows:

TABLE 8

Aspheric coefficients of the third preferred embodiment

| Surface # | 2 | 3 | 4 | 5 | 6 |
|---|---|---|---|---|---|
| k = | −5.27995E−01 | −1.00000E+00 | −9.00000E+01 | 9.09022E+00 | −5.05883E+01 |
| A4 = | 1.47359E−01 | −2.84796E−01 | −8.14549E−01 | −4.04063E−01 | −1.52834E−01 |
| A6 = | −4.64638E−01 | −5.93503E+00 | −4.31496E+00 | −1.47071E+00 | −1.76867E+00 |
| A8 = | 6.25308E+00 | 2.06027E+01 | −3.75000E+00 | 2.96331E+00 | 3.85827E+00 |
| A10 = | −4.71791E+01 | −1.12665E+02 | 3.27216E+01 | −7.90518E+00 | 3.78816E+00 |
| A12 = | 6.41626E−09 | −1.91662E−07 | −1.91575E+02 | −8.58307E−07 | −6.39031E+01 |

| Surface # | 7 | 8 | 9 | 10 | 11 |
|---|---|---|---|---|---|
| k = | 1.00000E+00 | 1.77871E+01 | −3.31996E+00 | −9.00000E+01 | −5.87567E+00 |
| A4 = | −2.15637E−01 | 2.14096E−01 | −4.38731E−01 | −2.04020E+00 | −1.18656E+00 |

TABLE 8-continued

Aspheric coefficients of the third preferred embodiment

| A6 = | −1.29295E+00 | −6.82614E−01 | 8.16921E−01 | 7.44776E+00 | 3.67354E+00 |
|---|---|---|---|---|---|
| A8 = | −5.21609E+00 | 3.92507E+01 | 1.79339E+01 | −1.83110E+01 | −8.53587E+00 |
| A10 = | −4.71082E+00 | −3.96045E+02 | −4.63389E+01 | 2.80099E+01 | 1.28293E+01 |
| A12 = | 3.18331E+01 | 1.70329E+03 | −3.03500E+01 | −2.70918E+01 | −1.21580E+01 |
| A14 = | | −3.72966E+03 | 1.79816E+02 | 1.60342E+01 | 6.43635E+00 |
| A16 = | | 3.28928E+03 | −1.34425E+02 | −4.01492E+00 | −1.43141E+00 |

With reference to Table 7 and FIG. 3B for an optical lens assembly for imaging pickup of this preferred embodiment, the optical lens assembly for imaging pickup has a focal length f=1.80 (mm), an f-number Fno=2.60, and a half of the maximum view angle HFOV=35.2°. After the optical data of this preferred embodiment are calculated and derived, the optical imaging system for pickup satisfies related conditions as shown in Table 9 below, and the related symbols have been described above and thus will not be described again.

TABLE 9

Data of related relations of the third preferred embodiment

| Relation | Data |
|---|---|
| $v_1 - v_2$ | 32.1 |
| $(CT_2 + CT_3)$ [mm] | 0.52 |
| $CT_{min}$ [mm] | 0.22 |
| $CT_{max}$ [mm] | 0.34 |
| $CT_{min}/CT_{max}$ | 0.66 |
| $\Sigma CT$ [mm] | 1.43 |
| $ET_3$ [mm] | 0.18 |
| $T_D$ [mm] | 1.75 |
| $(TTL/f)*T_D$ [mm] | 2.23 |
| $|f/f_3|$ | 0.31 |
| $f_4/f$ | 0.54 |
| $f_5/f$ | −0.45 |
| $S_D/T_D$ | 0.97 |

According to the optical data as shown in Table 7 and the series of aberration curves as shown in FIG. 3B, the optical lens assembly for imaging pickup in accordance with this preferred embodiment of the present invention provides good correction results in aspects of the longitudinal spherical aberration, astigmatic field curving, and distortion.

<Fourth Preferred Embodiment>

Figure 4A:
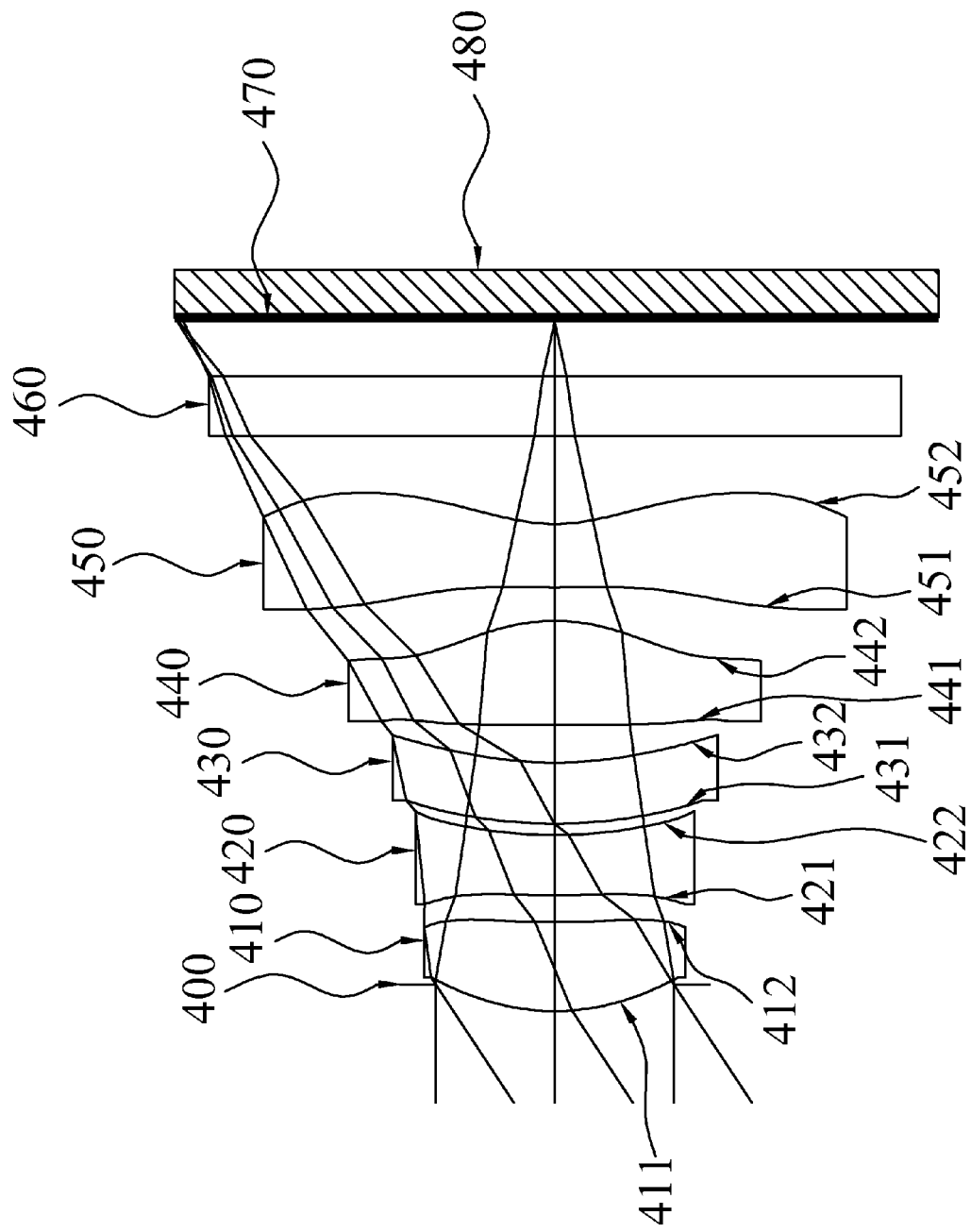
FIG. 4A is a schematic view of an optical lens assembly for imaging pickup in accordance with the fourth preferred embodiment of the present invention.
Figure 4B:
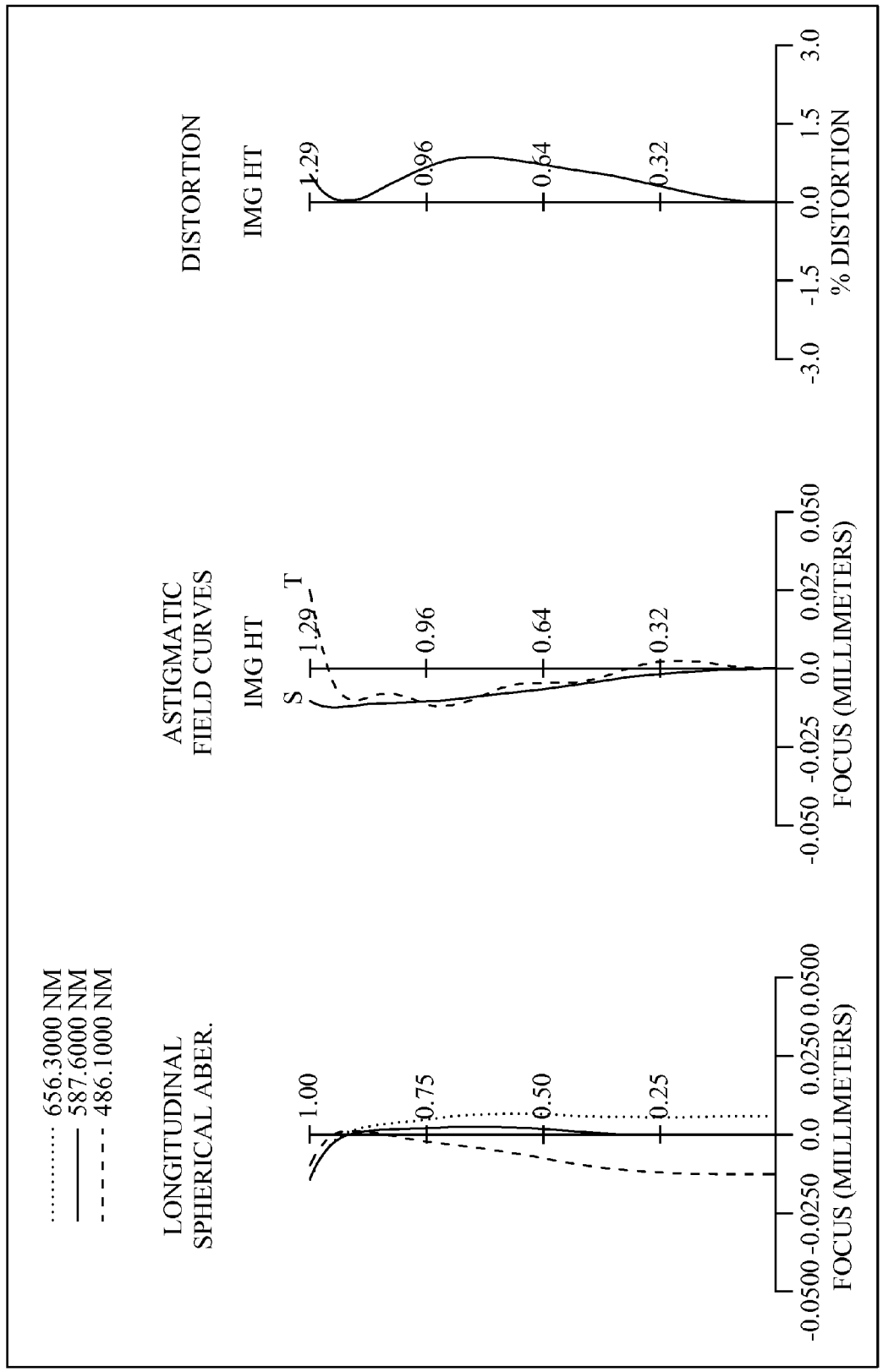
FIG. 4B is a schematic view of a series of aberration curves of the fourth preferred embodiment of the present invention.

With reference to FIGS. 4A and 4B for a schematic view and a series of aberration curves of an optical lens assembly for imaging pickup in accordance with the fourth preferred embodiment of the present invention respectively, the optical lens assembly for imaging pickup comprises five lens elements, an aperture stop 400 and an IR-filter 460. More specifically, the optical lens assembly for imaging pickup, sequentially arranged from an object side to an image side along an optical axis, comprises: an aperture stop 400; a plastic first lens element 410 with positive refractive power has a convex object-side surface 411 and a concave image-side surface 412, and both object-side surface 411 and image-side surface 412 are aspheric; a plastic second lens element 420 with negative refractive power has a convex object-side surface 421 and a concave image-side surface 422, and both object-side surface 421 and image-side surface 422 are aspheric; a plastic third lens element 430 with negative refractive power has a convex object-side surface 431 and a concave image-side surface 432, and both object-side surface 431 and image-side surface 432 are aspheric; a plastic fourth lens element 440 with positive refractive power has a concave object-side surface 441 and a convex image-side surface 442, and both object-side surface 441 and image-side surface 442 are aspheric; a plastic fifth lens element 450 with negative refractive power has a convex object-side surface 451 and a concave image-side surface 452, and both object-side surface 451 and image-side surface 452 are aspheric and having at least one inflection point; and an IR-filter 460 made of panel glass for adjusting a wavelength section of the light of an image, and an image sensor 480 at an image plane 470. With the combination of the five lens elements, the aperture stop 400 and the IR-filter 460, an image of the photographed object can be formed at the image sensor 480.

TABLE 10

Optical data of the fourth preferred embodiment
f = 1.93 mm, Fno = 2.40, HFOV = 33.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.090 | | | | |
| 2 | | 0.785780 (ASP) | 0.301 | | | | |
| | Lens 1 | | | Plastic | 1.544 | 55.9 | 1.96 |
| 3 | | 2.589430 (ASP) | 0.092 | | | | |
| 4 | | 3.876200 (ASP) | 0.203 | | | | |
| | Lens 2 | | | Plastic | 1.634 | 23.8 | −4.79 |
| 5 | | 1.667890 (ASP) | 0.039 | | | | |
| 6 | | 1.800620 (AS) | 0.206 | | | | |
| | Lens 3 | | | Plastic | 1.634 | 23.8 | −12.10 |
| 7 | | 1.393620 (ASP) | 0.128 | | | | |
| 8 | | −62.057200 (ASP) | 0.351 | | | | |
| | Lens 4 | | | Plastic | 1.544 | 55.9 | 1.14 |
| 9 | | −0.617160 (ASP) | 0.114 | | | | |
| 10 | | 5.766600 (ASP) | 0.214 | | | | |
| | Lens 5 | | | Plastic | 1.544 | 55.9 | −1.18 |
| 11 | | 0.568810 (ASP) | 0.300 | | | | |

TABLE 10-continued

Optical data of the fourth preferred embodiment
f = 1.93 mm, Fno = 2.40, HFOV = 33.5 deg.

| Surface # | | Curvature Radius | Thickness | Material | Index | Abbe # | Focal length |
|---|---|---|---|---|---|---|---|
| 12 | | Plano | 0.200 | | | | |
| | IR-filter | | | Glass | 1.517 | 64.2 | — |
| 13 | | Plano | 0.200 | | | | |
| 14 | Image | Plano | — | | | | |

Note:
Reference wavelength is 587.6 nm.
ASP stands for aspherical surfaces.

The optical data of this preferred embodiment are listed in Table 10, wherein the object-side surface and the image-side surface of the first lens element 410 to the fifth lens element 450 comply with the aspheric surface formula as given in Equation (14), and their aspheric coefficients are listed in Table 11 as follows:

TABLE 11

Aspheric coefficients of the fourth preferred embodiment

| Surface # | 2 | 3 | 4 | 5 | 6 |
|---|---|---|---|---|---|
| k = | −6.46461E−01 | −8.43147E+01 | −8.66712E+01 | 4.97641E+00 | 2.71397E+00 |
| A4 = | 1.17162E−01 | −3.37901E−01 | −1.04759E+00 | 2.62964E−02 | 4.11669E−02 |
| A6 = | −5.98032E−01 | −5.96610E+00 | −4.65008E+00 | −2.76991E+00 | −6.04591E−01 |
| A8 = | 4.77091E+00 | 1.87412E+01 | 9.25331E+00 | 1.29860E+01 | 2.81269E+00 |
| A10 = | −3.21356E+01 | −8.19101E+01 | 1.83967E+01 | | 1.21124E+00 |
| A12 = | −2.06250E+01 | 1.58248E+02 | 7.40872E+01 | | −1.40591E+01 |

| Surface # | 7 | 8 | 9 | 10 | 11 |
|---|---|---|---|---|---|
| k = | −2.17672E+00 | −5.50064E+01 | −4.19553E+00 | −8.79060E+01 | −6.07588E+00 |
| A4 = | −1.71178E−01 | 1.73077E−01 | −2.76648E−01 | −1.98911E+00 | −1.22683E+00 |
| A6 = | −1.59963E−02 | −2.01715E−01 | 1.03614E+00 | 7.81350E+00 | 3.76999E+00 |
| A8 = | 5.29433E−01 | 4.01878E+01 | 1.79865E+00 | −1.80231E+01 | −8.60952E+00 |
| A10 = | 4.80605E−01 | −3.92394E+02 | −4.67154E+01 | 2.79329E+01 | 1.28219E+01 |
| A12 = | 1.89360E−01 | 1.70888E+03 | −3.10759E+01 | −2.76115E+01 | −1.20815E+01 |
| A14 = | | −3.77429E+03 | 1.78803E+02 | 1.54542E+01 | 6.48214E+00 |
| A16 = | | 3.30814E+03 | −1.34945E+02 | −3.75460E+00 | −1.48589E+00 |

With reference to Table 10 and FIG. 4B for an optical lens assembly for imaging pickup of this preferred embodiment, the optical lens assembly for imaging pickup has a focal length f=1.93 (mm), an f-number Fno=2.40, and a half of the maximum view angle HFOV=33.5°. After the optical data of this preferred embodiment are calculated and derived, the optical imaging system for pickup satisfies related conditions as shown in Table 12 below, and the related symbols have been described above and thus will not be described again.

TABLE 12

Data of related relations of the fourth preferred embodiment

| Relation | Data |
|---|---|
| $v_1 - v_2$ | 32.1 |
| $(CT_2 + CT_3)$ [mm] | 0.41 |
| $CT_{min}$ [mm] | 0.20 |
| $CT_{max}$ [mm] | 0.35 |
| $CT_{min}/CT_{max}$ | 0.58 |
| $\Sigma CT$ [mm] | 1.28 |
| $ET_3$ [mm] | 0.22 |
| $T_D$ [mm] | 1.65 |
| $(TTL/f)*T_D$ [mm] | 1.95 |
| $|f/f_3|$ | 0.16 |
| $f_4/f$ | 0.59 |

TABLE 12-continued

Data of related relations of the fourth preferred embodiment

| Relation | Data |
|---|---|
| $f_5/f$ | −0.61 |
| $S_D/T_D$ | 0.95 |

According to the optical data as shown in Table 10 and the aberration curves as shown in FIG. 4B, the optical lens assembly for imaging pickup in accordance with this preferred embodiment of the present invention provides good correction results in aspects of the longitudinal spherical aberration, astigmatic field curving, and distortion.

<Fifth Preferred Embodiment>

Figure 5A:
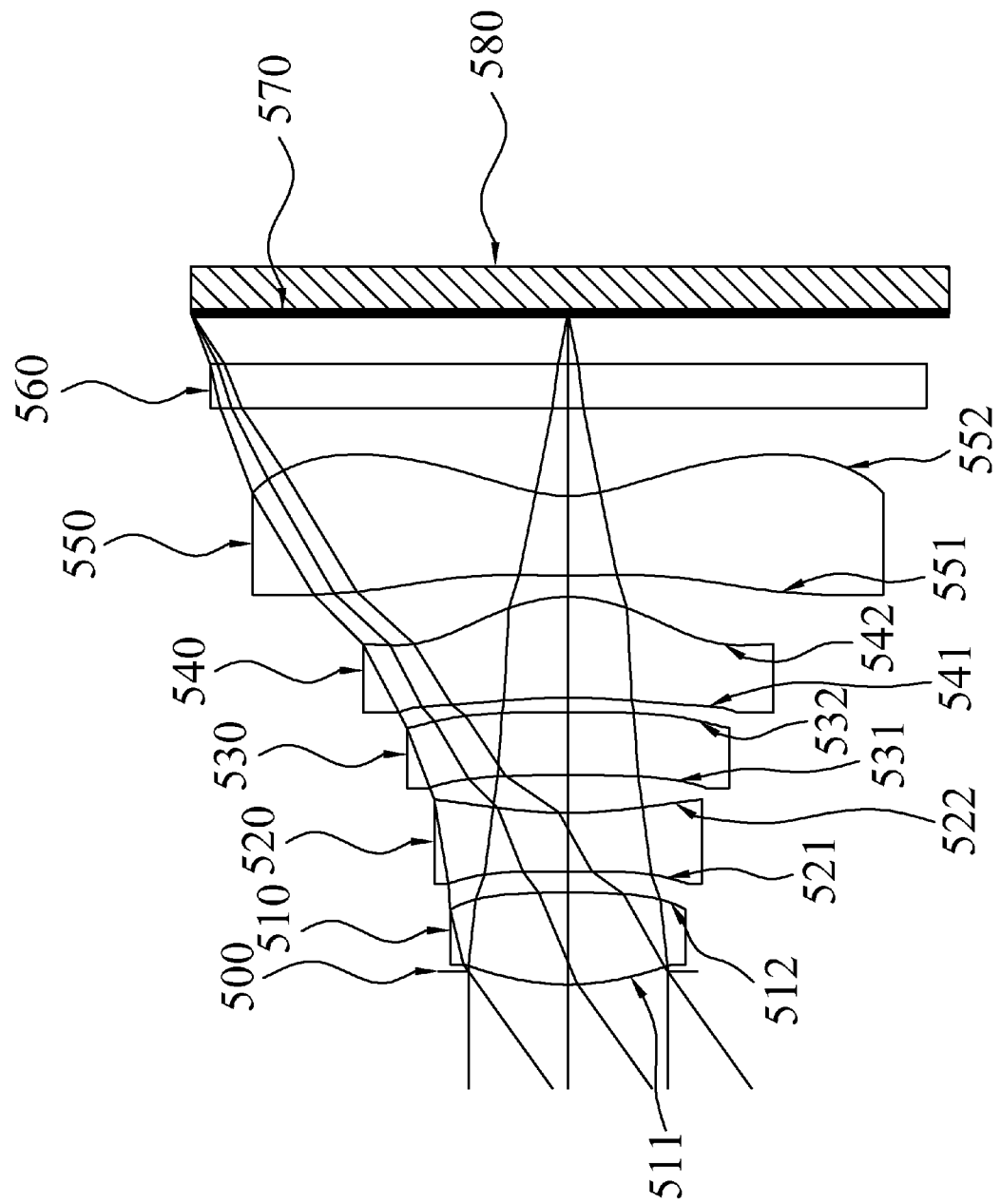
FIG. 5A is a schematic view of an optical lens assembly for imaging pickup in accordance with the fifth preferred embodiment of the present invention.
Figure 5B:
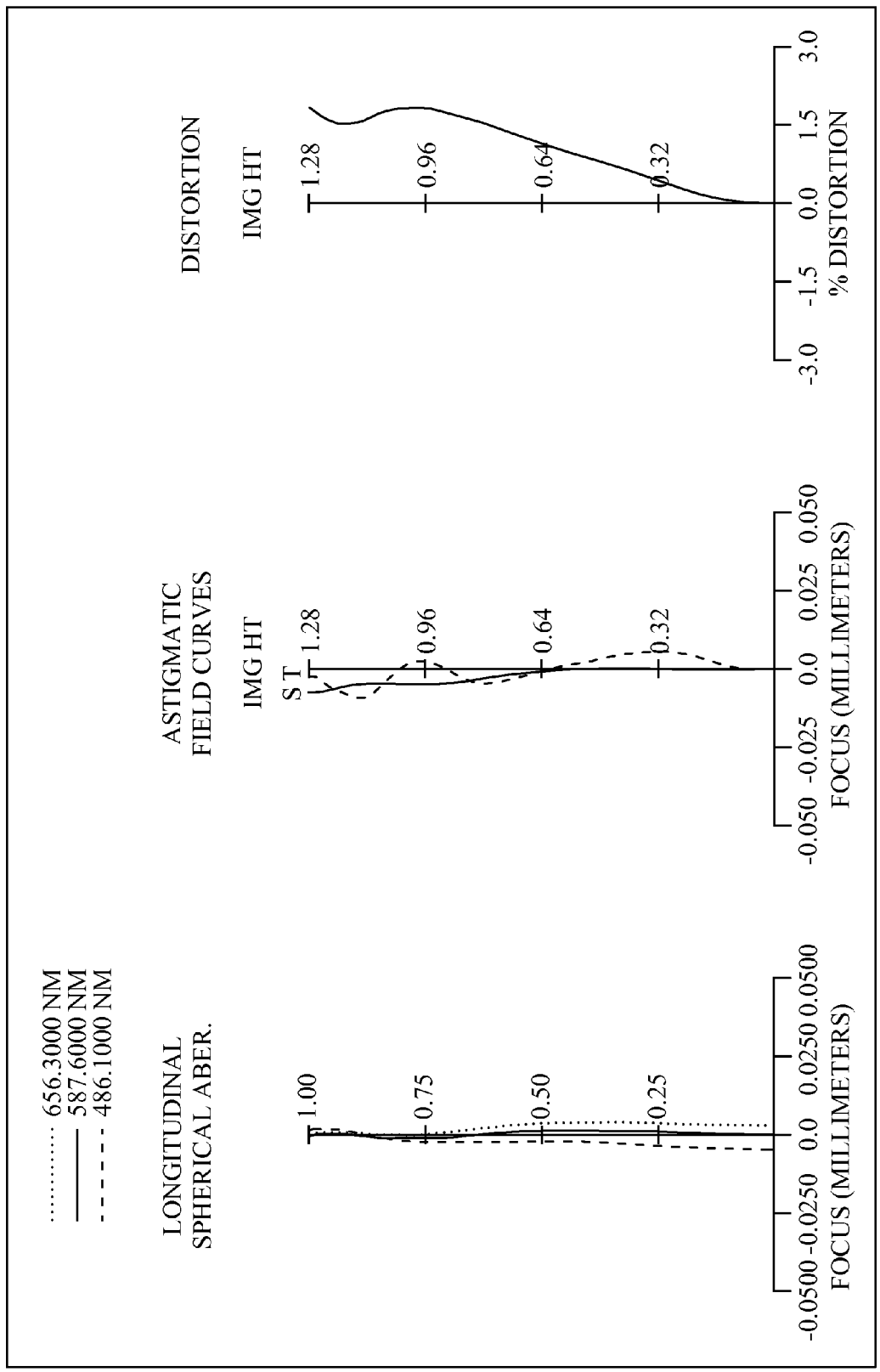
FIG. 5B is a schematic view of a series of aberration curves of the fifth preferred embodiment of the present invention.

With reference to FIGS. 5A and 5B for a schematic view and a series of aberration curves of an optical lens assembly for imaging pickup in accordance with the fifth preferred embodiment of the present invention respectively, the optical lens assembly for imaging pickup comprises five lens elements, an aperture stop 500 and an IR-filter 560. More specifically, the optical lens assembly for imaging pickup, sequentially arranged from an object side to an image side along an optical axis, comprises: an aperture stop 500; a plastic first lens element 510 with positive refractive power has a convex object-side surface 511 and a convex image-side surface 512, and both object-side surface 511 and image-side surface 512 are aspheric; a plastic second lens element 520 with negative refractive power has a concave object-side surface 521 and a concave image-side surface 522, and both object-side surface 521 and image-side surface 522 are aspheric; a plastic third lens element 530 with negative refractive power has a concave object-side surface 531 and a convex image-side surface 532, and both object-side surface 531 and image-side surface 532 are aspheric; a plastic fourth lens element 540 with positive refractive power has a concave object-side surface 541 and a convex image-side surface 542, and both object-side surface 541 and image-side surface 542 are aspheric; a plastic fifth lens element 550 with negative refractive power has a convex object-side surface 551 and a concave image-side surface 552, and both object-side surface 551 and image-side surface 552 are aspheric and having at least one inflection point; and an IR-filter 560 made of panel glass for adjusting a wavelength section of the light of an image, and an image sensor 580 at an image plane 570. With the combination of the five lens elements, the aperture stop 500 and the IR-filter 560, an image of the photographed object that can be formed at the image sensor 580.

TABLE 13

Optical data of the fifth preferred embodiment
f = 1.77 mm, Fno = 2.60, HFOV = 35.6 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.045 | | | | |
| 2 | | 0.886770 (ASP) | 0.314 | | | | |
| | Lens 1 | | | Plastic | 1.544 | 55.9 | 1.36 |
| 3 | | −3.837100 (ASP) | 0.072 | | | | |
| 4 | | −14.516800 (ASP) | 0.200 | | | | |
| | Lens 2 | | | Plastic | 1.640 | 23.3 | −2.27 |
| 5 | | 1.624450 (ASP) | 0.129 | | | | |
| 6 | | −9.451500 (ASP) | 0.214 | | | | |
| | Lens 3 | | | Plastic | 1.544 | 55.9 | −39.58 |
| 7 | | −16.976500 (ASP) | 0.049 | | | | |
| 8 | | −2.518920 (ASP) | 0.344 | | | | |
| | Lens 4 | | | Plastic | 1.544 | 55.9 | 1.05 |
| 9 | | −0.489410 (ASP) | 0.073 | | | | |
| 10 | | 4.080600 (ASP) | 0.272 | | | | |
| | Lens 5 | | | Plastic | 1.544 | 55.9 | −1.00 |
| 11 | | 0.470340 (ASP) | 0.300 | | | | |
| 12 | | Plano | 0.150 | | | | |
| | IR-filter | | | Glass | 1.517 | 64.2 | — |
| 13 | | Plano | 0.174 | | | | |
| 14 | Image | Plano | — | | | | |

Note:
Reference wavelength is 587.6 nm.
ASP stands for aspherical surfaces.

The optical data of this preferred embodiment are listed in Table 13, wherein the object-side surface and the image-side surface of the first lens element 510 to the fifth lens element 550 comply with the aspheric surface formula as given in Equation (14), and their aspheric coefficients are listed in Table 14 as follows:

TABLE 14

Aspheric coefficients of the fifth preferred embodiment

| Surface # | 2 | 3 | 4 | 5 | 6 |
|---|---|---|---|---|---|
| k = | −9.78653E−01 | 1.00000E+00 | −9.00000E+01 | −1.40804E+00 | −1.00000E+00 |
| A4 = | 5.50849E−02 | −7.35541E−01 | −1.05205E+00 | −2.56222E−01 | −5.55407E−01 |
| A6 = | −1.47144E+00 | −6.33317E+00 | −4.75182E+00 | −2.59582E+00 | −1.08857E+00 |
| A8 = | 4.27227E+00 | 2.22245E+01 | 5.61553E+00 | 1.13522E+01 | 3.67733E+00 |
| A10 = | −8.44361E+01 | −1.00540E+02 | 7.82519E+01 | −2.12597E+01 | −2.27116E−01 |
| A12 = | −2.53399E+00 | 1.56329E+02 | 4.80669E+01 | 4.78919E+01 | −1.56873E+01 |

| Surface # | 7 | 8 | 9 | 10 | 11 |
|---|---|---|---|---|---|
| k = | 5.00000E+00 | 1.68280E+01 | −3.08589E+00 | −1.30650E+01 | −5.09968E+00 |
| A4 = | −5.76579E−01 | 2.66817E−01 | −3.26224E−01 | −1.99010E+00 | −1.21228E+00 |
| A6 = | −4.79976E−01 | −2.06842E−01 | 1.33546E+00 | 7.68238E+00 | 3.74259E+00 |
| A8 = | 2.31902E−02 | 4.22979E+01 | 1.83065E+01 | −1.80124E+01 | −8.48621E+00 |
| A10 = | 4.34798E+00 | −3.91092E+02 | −4.66310E+01 | 2.80711E+01 | 1.27494E+01 |
| A12 = | 1.15667E+01 | 1.70176E+03 | −3.13561E+01 | −2.74718E+01 | −1.21359E+01 |
| A14 = | | −3.78279E+03 | 1.78362E+02 | 1.53998E+01 | 6.49392E+00 |
| A16 = | | 3.38230E+03 | −1.35517E+02 | −3.97639E+00 | −1.47340E+00 |

With reference to Table 13 and FIG. 5B for an optical lens assembly for imaging pickup of this preferred embodiment, the optical lens assembly for imaging pickup has a focal length f=1.77 (mm), an f-number Fno=2.60, and a half of the maximum view angle HFOV=35.6°. After the optical data of this preferred embodiment are calculated and derived, the optical imaging system for pickup satisfies related conditions as shown in Table 15 below, and the related symbols have been described above and thus will not be described again.

TABLE 15

Data of related relations of the fifth preferred embodiment

| Relation | Data |
|---|---|
| $v_1 - v_2$ | 32.6 |
| $(CT_2 + CT_3)$ [mm] | 0.41 |
| $CT_{min}$ [mm] | 0.20 |
| $CT_{max}$ [mm] | 0.34 |
| $CT_{min}/CT_{max}$ | 0.58 |
| $\Sigma CT$ [mm] | 1.34 |
| $ET_3$ [mm] | 0.20 |
| $T_D$ [mm] | 1.67 |
| $(TTL/f)*T_D$ [mm] | 2.12 |
| $|f/f_3|$ | 0.05 |
| $f_4/f$ | 0.60 |
| $f_5/f$ | −0.57 |
| $S_D/T_D$ | 0.97 |

According to the optical data as shown in Table 13 and the series of aberration curves as shown in FIG. 5B, the optical lens assembly for imaging pickup in accordance with this preferred embodiment of the present invention provides good correction results in aspects of the longitudinal spherical aberration, astigmatic field curving, and distortion.

<Sixth Preferred Embodiment>

Figure 6A:
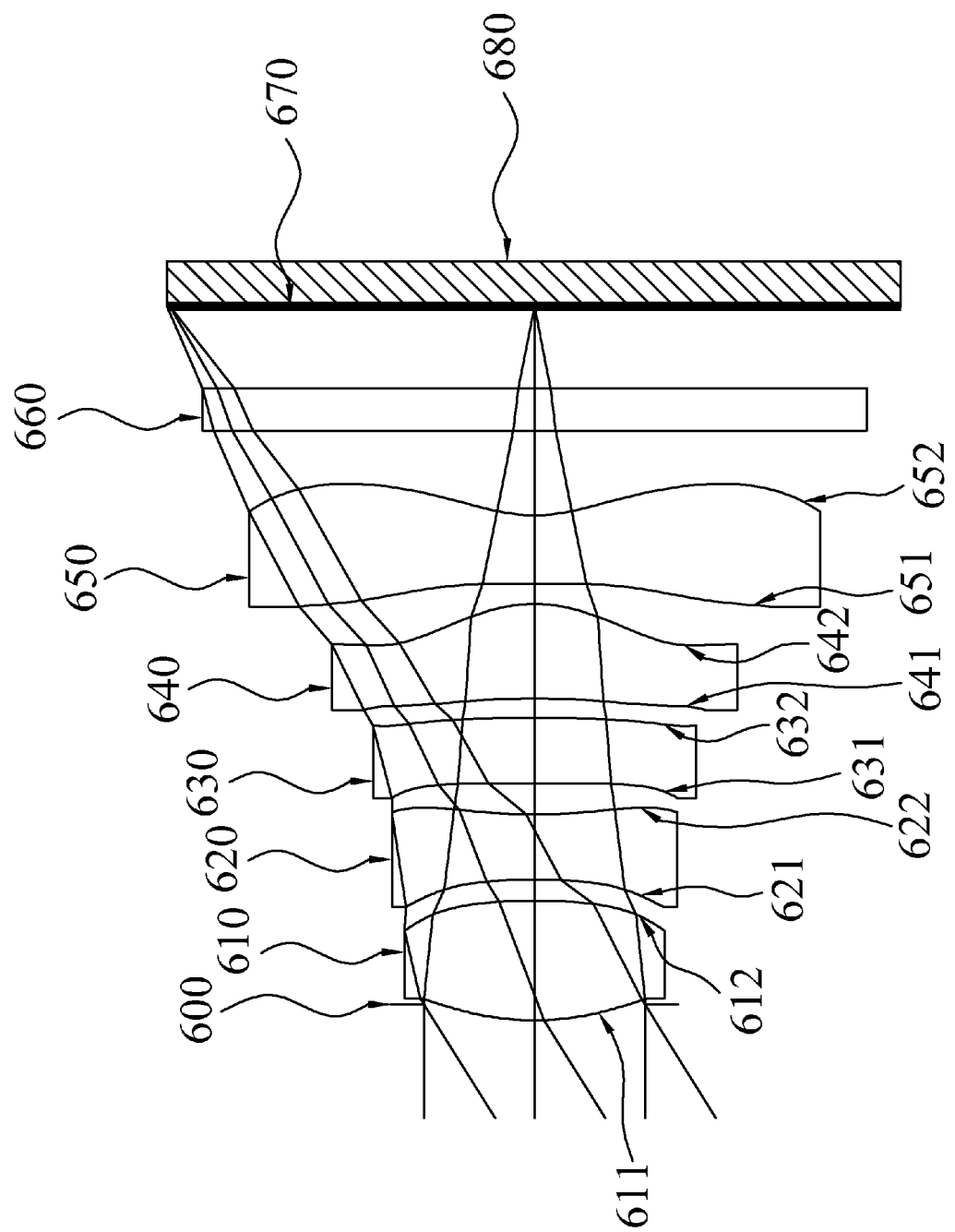
FIG. 6A is a schematic view of an optical lens assembly for imaging pickup in accordance with the sixth preferred embodiment of the present invention.
Figure 6B:
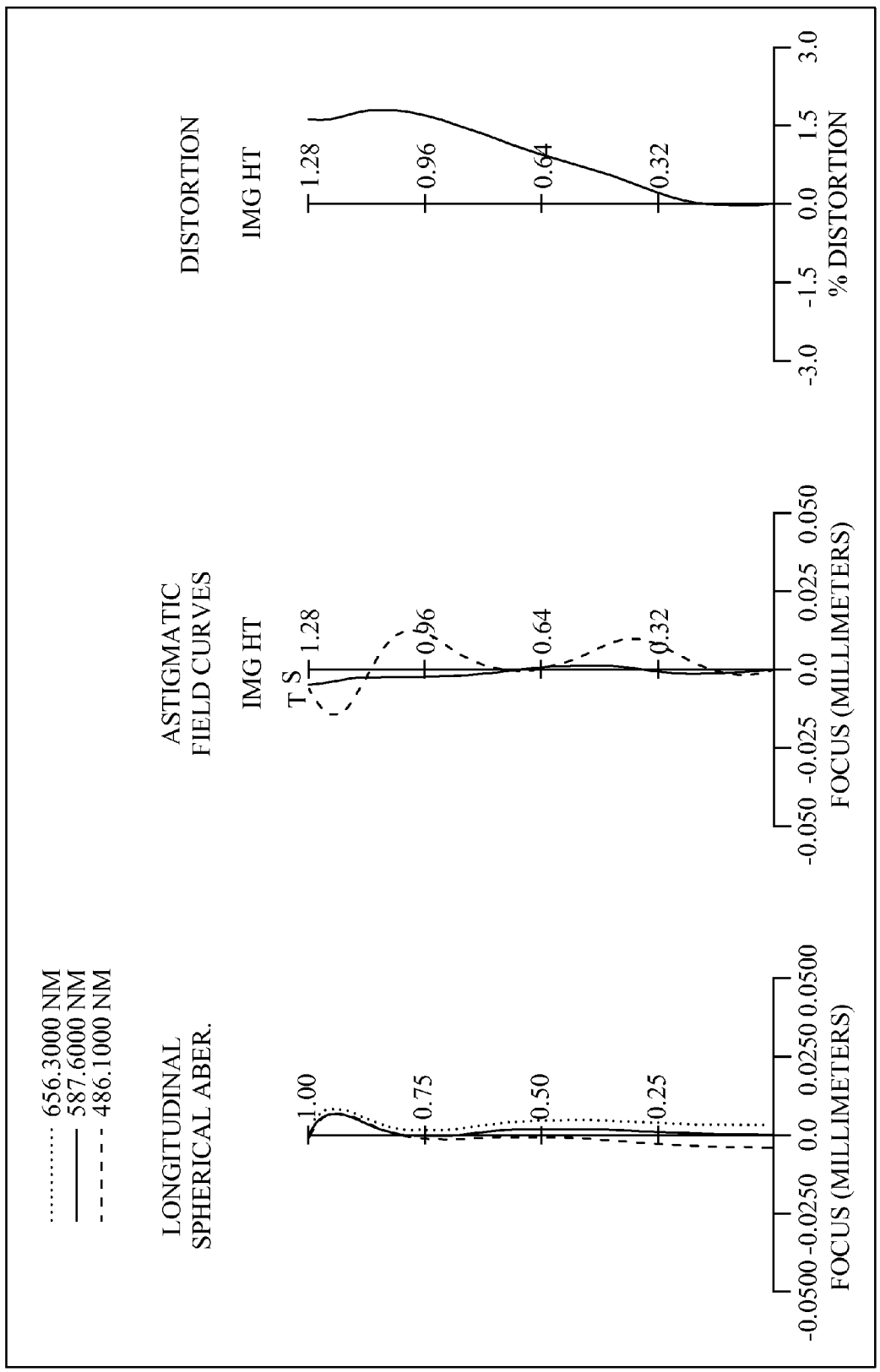
FIG. 6B is a schematic view of a series of aberration curves of the sixth preferred embodiment of the present invention.

With reference to FIGS. 6A and 6B for a schematic view and a series of aberration curves of an optical lens assembly for imaging pickup in accordance with the sixth preferred embodiment of the present invention respectively, the optical lens assembly for imaging pickup comprises five lens elements, an aperture stop 600 and an IR-filter 660. More specifically, the optical lens assembly for imaging pickup, sequentially arranged from an object side to an image side along an optical axis, comprises: an aperture stop 600; a plastic first lens element 610 with positive refractive power has a convex object-side surface 611 and a convex image-side surface 612, and both object-side surface 611 and image-side surface 612 are aspheric; a plastic second lens element 620 with negative refractive power has a concave object-side surface 621 and a concave image-side surface 622, and both object-side surface 621 and image-side surface 622 are aspheric; a plastic third lens element 630 with positive refractive power has a concave object-side surface 631 and a convex image-side surface 632, and both object-side surface 631 and image-side surface 632 are aspheric; a plastic fourth lens element 640 with positive refractive power has a concave object-side surface 641 and a convex image-side surface 642, and both object-side surface 641 and image-side surface 642 are aspheric; a plastic fifth lens element 650 with negative refractive power has a convex object-side surface 651 and a concave image-side surface 652, and both object-side surface 651 and image-side surface 652 are aspheric and having at least one inflection point; and an IR-filter 660 made of panel glass for adjusting a wavelength section of the light of an image, and an image sensor 680 at an image plane 670. With the combination of the five lens elements, the aperture stop 600 and the IR-filter 660, an image of the photographed object can be formed at the image sensor 680.

TABLE 16

Optical data of the sixth preferred embodiment
f = 2.02 mm, Fno = 2.60, HFOV = 32.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.055 | | | | |
| 2 | | 0.969400 (ASP) | 0.422 | | | | |
| | Lens 1 | | | Plastic | 1.544 | 55.9 | 1.25 |
| 3 | | −1.945770 (ASP) | 0.074 | | | | |
| 4 | | −2.142760 (ASP) | 0.230 | | | | |
| | Lens 2 | | | Plastic | 1.607 | 26.6 | −1.64 |
| 5 | | 1.939610 (ASP) | 0.110 | | | | |
| 6 | | −41.666700 (ASP) | 0.230 | | | | |
| | Lens 3 | | | Plastic | 1.607 | 26.6 | 19.02 |
| 7 | | −9.061000 (ASP) | 0.069 | | | | |
| 8 | | −2.576910 (ASP) | 0.333 | | | | |
| | Lens 4 | | | Plastic | 1.544 | 55.9 | 1.05 |
| 9 | | −0.489590 (ASP) | 0.071 | | | | |
| 10 | | 26.686900 (ASP) | 0.240 | | | | |
| | Lens 5 | | | Plastic | 1.544 | 55.9 | −0.94 |
| 11 | | 0.498820 (ASP) | 0.300 | | | | |
| 12 | | Plano | 0.150 | | | | |
| | IR-filter | | | Glass | 1.517 | 64.2 | — |
| 13 | | Plano | 0.288 | | | | |
| 14 | Image | Plano | — | | | | |

Note:
Reference wavelength is 587.6 nm.
ASP stands for aspherical surfaces.

The optical data of this preferred embodiment are listed in Table 16, wherein the object-side surface and the image-side surface of the first lens element 610 to the fifth lens element 650 comply with the aspheric surface formula as given in Equation (14), and their aspheric coefficients are listed in Table 17 as follows:

TABLE 17

Aspheric coefficients of the sixth preferred embodiment

| Surface # | 2 | 3 | 4 | 5 | 6 |
|---|---|---|---|---|---|
| k = | −1.02928E+00 | −7.19179E+00 | −1.05752E+01 | −1.26181E+00 | −1.00000E+00 |
| A4 = | 4.56223E−02 | −6.48788E−01 | −9.82703E−01 | −2.35388E−01 | −2.30477E−01 |
| A6 = | −1.34802E+00 | −5.56573E+00 | −4.47908E+00 | −3.27249E+00 | −1.41763E+00 |
| A8 = | 6.98202E+00 | 2.24020E+01 | 5.66662E+00 | 6.90037E+00 | 2.08242E−01 |
| A10 = | −5.56299E+01 | −8.60553E+01 | 4.80708E+01 | −3.06647E+01 | −9.15961E+00 |
| A12 = | −2.53397E+00 | 1.56329E+02 | 4.80671E+00 | 4.78919E+01 | −1.56873E+01 |

| Surface # | 7 | 8 | 9 | 10 | 11 |
|---|---|---|---|---|---|
| k = | −9.00000E+01 | 1.63184E+01 | −3.56595E+00 | 1.00000E+00 | −6.43482E+00 |
| A4 = | −3.28324E−01 | 2.27547E−01 | −2.18615E−01 | −1.87254E+00 | −1.23303E+00 |
| A6 = | −1.20568E−01 | −1.30821E−02 | 1.24248E+00 | 7.75672E+00 | 3.81229E+00 |
| A8 = | 6.11105E−01 | 4.25529E+01 | 1.80507E+00 | −1.80649E+01 | −8.62050E+00 |
| A10 = | 4.46156E+00 | −3.90880E+02 | −4.68216E+01 | 2.79381E+01 | 1.28140E+01 |
| A12 = | 5.23448E+00 | 1.70151E+03 | −3.13293E+01 | −2.76111E+01 | −1.20991E+01 |
| A14 = | | −3.78314E+03 | 1.78742E+02 | 1.54082E+01 | 6.49940E+00 |
| A16 = | | 3.37394E+03 | −1.34256E+02 | −3.75279E+00 | −1.50274E+00 |

With reference to Table 16 and FIG. 6B for an optical lens assembly for imaging pickup of this preferred embodiment, the optical lens assembly for imaging pickup has a focal length f=2.02 (mm), an f-number Fno=2.60, and a half of the maximum view angle HFOV=32.0°. After the optical data of this preferred embodiment are calculated and derived, the optical imaging system for pickup satisfies related conditions as shown in Table 18 below, and the related symbols have been described above and thus will not be described again.

TABLE 18

Data of related relations of the sixth preferred embodiment

| Relation | Data |
|---|---|
| $v_1 - v_2$ | 29.3 |
| $(CT_2 + CT_3)$ [mm] | 0.46 |
| $CT_{min}$ [mm] | 0.23 |
| $CT_{max}$ [mm] | 0.42 |
| $CT_{min}/CT_{max}$ | 0.55 |
| $\Sigma CT$ [mm] | 1.46 |
| $ET_3$ [mm] | 0.26 |
| $T_D$ [mm] | 1.78 |
| $(TTL/f)*T_D$ [mm] | 2.17 |
| $|f/f_3|$ | 0.11 |
| $f_4/f$ | 0.52 |
| $f_5/f$ | −0.46 |
| $S_D/T_D$ | 0.97 |

According to the optical data as shown in Table 16 and the series of aberration curves as shown in FIG. 6B, the optical lens assembly for imaging pickup in accordance with this preferred embodiment of the present invention provides good correction results in aspects of the longitudinal spherical aberration, astigmatic field curving, and distortion.

<Seventh Preferred Embodiment>

Figure 7A:
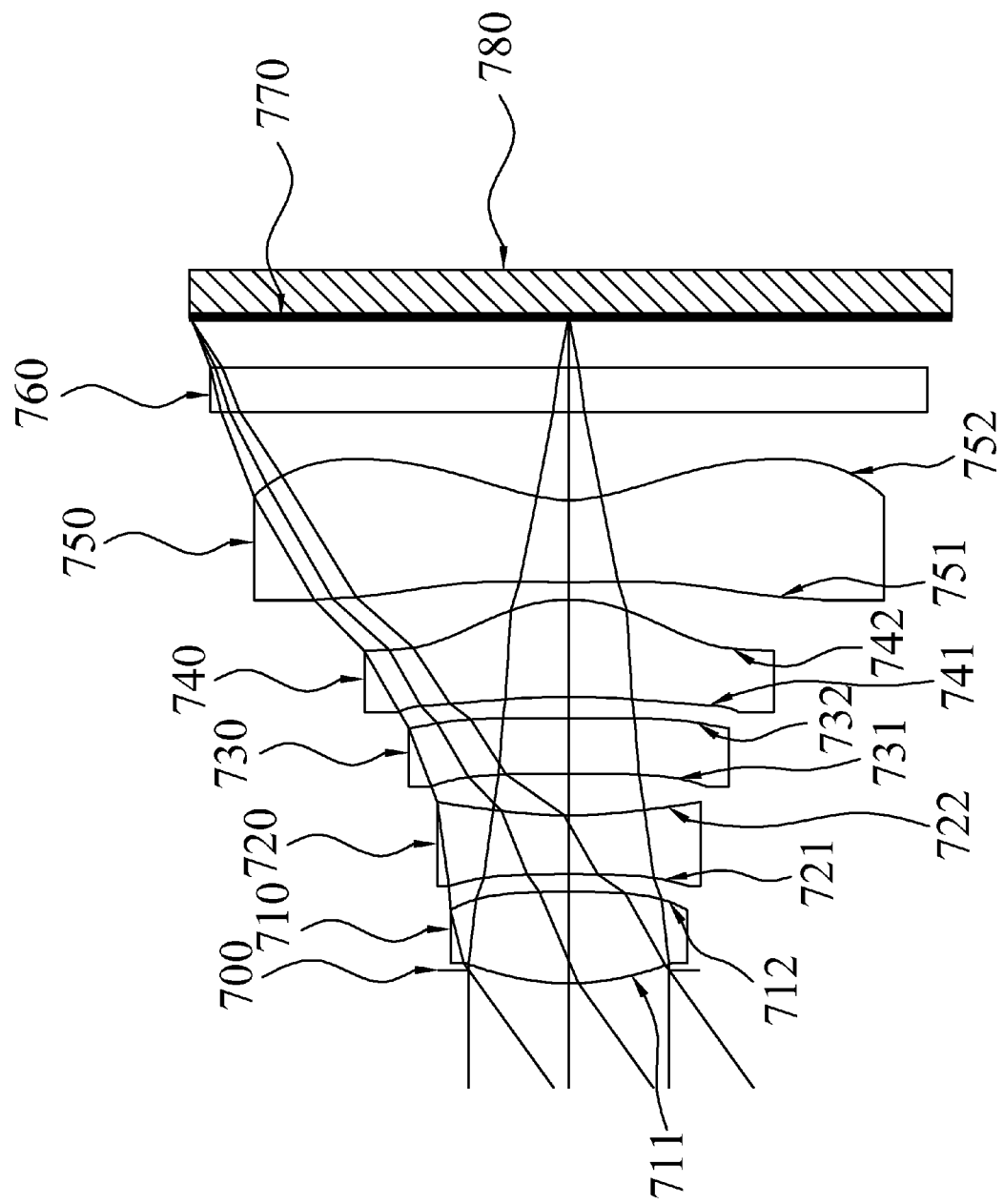
FIG. 7A is a schematic view of an optical lens assembly for imaging pickup in accordance with the seventh preferred embodiment of the present invention.
Figure 7B:
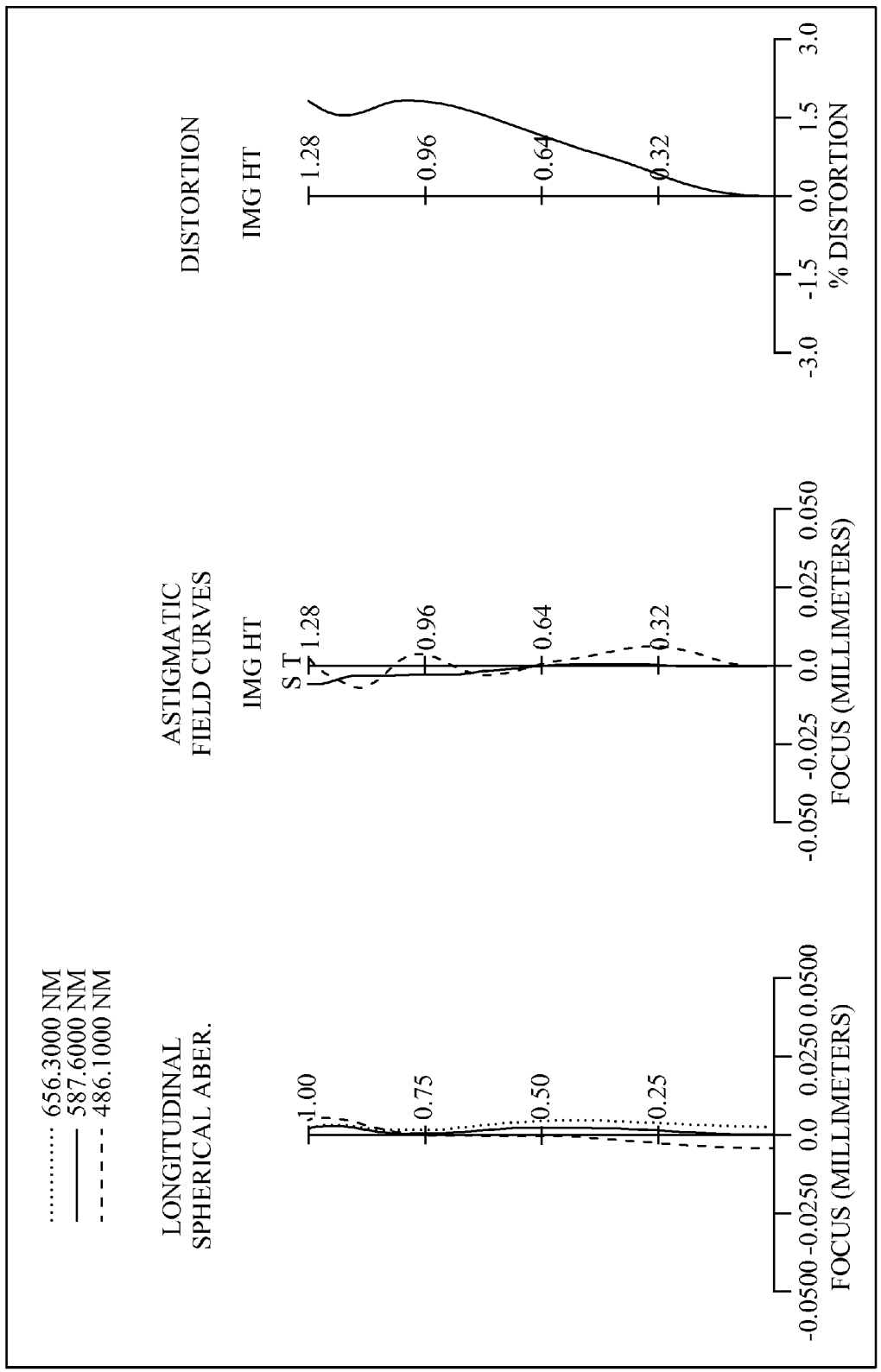
FIG. 7B is a schematic view of a series of aberration curves of the seventh preferred embodiment of the present invention.

With reference to FIGS. 7A and 7B for a schematic view and a series of aberration curves of an optical lens assembly for imaging pickup in accordance with the seventh preferred embodiment of the present invention respectively, the optical lens assembly for imaging pickup comprises five lens elements, an aperture stop 700 and an IR-filter 760. More specifically, the optical lens assembly for imaging pickup, sequentially arranged from an object side to an image side along an optical axis, comprises: an aperture stop 700; a plastic first lens element 710 with positive refractive power has a convex object-side surface 711 and a convex image-side surface 712, and both object-side surface 711 and image-side surface 712 are aspheric; a plastic second lens element 720 with negative refractive power has a concave object-side surface 721 and a concave image-side surface 722, and both object-side surface 721 and image-side surface 722 are aspheric; a plastic third lens element 730 with negative refractive power has a concave object-side surface 731 and a concave image-side surface 732, and both object-side surface 731 and image-side surface 732 are aspheric; a plastic fourth lens element 740 with positive refractive power has a concave object-side surface 741 and a convex image-side surface 742, and both object-side surface 741 and image-side surface 742 are aspheric; a plastic fifth lens element 750 with negative refractive power has a convex object-side surface 751 and a concave image-side surface 752, and both object-side surface 751 and image-side surface 752 are aspheric and having at least one inflection point; and an IR-filter 760 made of panel glass for adjusting a wavelength section of the light of an image, and an image sensor 780 at an image plane 770. With the combination of the five lens elements, the aperture stop 700 and the IR-filter 760, an image of the photographed object can be formed the image sensor 780.

TABLE 19

Optical data of the seventh preferred embodiment
f = 1.76 mm, Fno = 2.60, HFOV = 35.6 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.045 | | | | |
| 2 | | 0.869890 (ASP) | 0.311 | | | | |
| | Lens 1 | | | Plastic | 1.544 | 55.9 | 1.31 |
| 3 | | −3.412600 (ASP) | 0.059 | | | | |
| 4 | | −9.352600 (ASP) | 0.200 | | | | |
| | Lens 2 | | | Plastic | 1.640 | 23.3 | −2.25 |
| 5 | | 1.71210 (ASP) | 0.141 | | | | |
| 6 | | −41.666700 (ASP) | 0.187 | | | | |
| | Lens 3 | | | Plastic | 1.544 | 55.9 | −17.46 |
| 7 | | 12.330500 (ASP) | 0.074 | | | | |
| 8 | | −2.556390 (ASP) | 0.329 | | | | |
| | Lens 4 | | | Plastic | 1.544 | 55.9 | 1.04 |
| 9 | | −0.484840 (ASP) | 0.060 | | | | |
| 10 | | 4.074900 (ASP) | 0.278 | | | | |
| | Lens 5 | | | Plastic | 1.544 | 55.9 | −1.00 |
| 11 | | 0.466860 (ASP) | 0.300 | | | | |
| 12 | | Plano | 0.150 | | | | |
| | IR-filter | | | Glass | 1.517 | 64.2 | — |
| 13 | | Plano | 0.170 | | | | |
| 14 | Image | Plano | — | | | | |

Note:
Reference wavelength is 587.6 nm.
ASP stands for aspherical surfaces.

The optical data of this preferred embodiment are listed in Table 19, wherein the object-side surface and the image-side surface of the first lens element 710 to the fifth lens element 750 comply with the aspheric surface formula as given in Equation (14), and their aspheric coefficients are listed in Table 20 as follows:

TABLE 20

Aspheric coefficients of the seventh preferred embodiment

| Surface # | 2 | 3 | 4 | 5 | 6 |
|---|---|---|---|---|---|
| k = | −1.00312E+00 | 1.00000E+00 | −9.00000E+01 | −8.76894E−01 | −1.00000E+00 |
| A4 = | 5.04694E−02 | −7.83657E−01 | −9.94400E−01 | −2.41953E−01 | −7.09183E−01 |
| A6 = | −1.47563E+00 | −6.67662E+00 | −4.50974E+00 | −2.44557E+00 | −1.39407E+00 |
| A8 = | 3.61075E+00 | 2.21194E+01 | 6.21491E+00 | 1.18302E+01 | 3.74196E+00 |
| A10 = | −9.52596E+01 | −9.31417E+01 | 8.76492E+01 | −2.02956E+01 | −7.21243E−02 |
| A12 = | −2.53399E+00 | 1.56329E+02 | 4.80669E+00 | 4.78919E+01 | −1.56873E+01 |

| Surface # | 7 | 8 | 9 | 10 | 11 |
|---|---|---|---|---|---|
| k = | −9.00000E+01 | 1.73656E+01 | −3.14363E+00 | −2.85373E+00 | −5.18381E+00 |
| A4 = | −5.96689E−01 | 2.67158E−01 | −3.54725E−01 | −1.98111E+00 | −1.20316E+00 |
| A6 = | −4.43403E−01 | −3.37294E−01 | 1.28266E+00 | 7.66479E+00 | 3.71005E+00 |
| A8 = | 3.18168E−02 | 4.22825E+01 | 1.82868E+00 | −1.80181E+01 | −8.45880E+00 |
| A10 = | 4.65925E+00 | −3.90620E+02 | −4.66196E+01 | 2.80639E+01 | 1.27451E+01 |
| A12 = | 1.37225E+01 | 1.70267E+03 | −3.13327E+01 | −2.74674E+01 | −1.21383E+01 |
| A14 = | | −3.78233E+03 | 1.78353E+02 | 1.54081E+01 | 6.49354E+00 |
| A16 = | | 3.36748E+03 | −1.35781E+02 | −3.97282E+00 | −1.47303E+00 |

With reference to Table 19 and FIG. 3B for an optical lens assembly for imaging pickup of this preferred embodiment, the optical lens assembly for imaging pickup has a focal length f=1.76 (mm), an f-number Fno=2.60, and a half of the maximum view angle HFOV=35.6°. After the optical data of this preferred embodiment are calculated and derived, the optical imaging system for pickup satisfies related conditions as shown in Table 21 below, and the related symbols have been described above and thus will not be described again.

TABLE 21

Data of related relations of the seventh preferred embodiment

| Relation | Data |
|---|---|
| $v_1 - v_2$ | 32.6 |
| $(CT_2 + CT_3)$ [mm] | 0.39 |
| $CT_{min}$ [mm] | 0.19 |
| $CT_{max}$ [mm] | 0.33 |
| $CT_{min}/CT_{max}$ | 0.57 |
| $\Sigma CT$ [mm] | 1.31 |

TABLE 21-continued

Data of related relations of the seventh preferred embodiment

| Relation | Data |
|---|---|
| $ET_3$ [mm] | 0.20 |
| $T_D$ [mm] | 1.64 |
| $(TTL/f)*T_D$ [mm] | 2.06 |
| $|f/f_3|$ | 0.10 |
| $f_4/f$ | 0.59 |
| $f_5/f$ | −0.57 |
| $S_D/T_D$ | 0.97 |

According to the optical data as shown in Table 19 and the aberration curves as shown in FIG. 7B, the optical lens assembly for imaging pickup in accordance with this preferred embodiment of the present invention provides good correction results in aspects of the longitudinal spherical aberration, astigmatic field curving, and distortion.

<Eighth Preferred Embodiment>

Figure 8A:
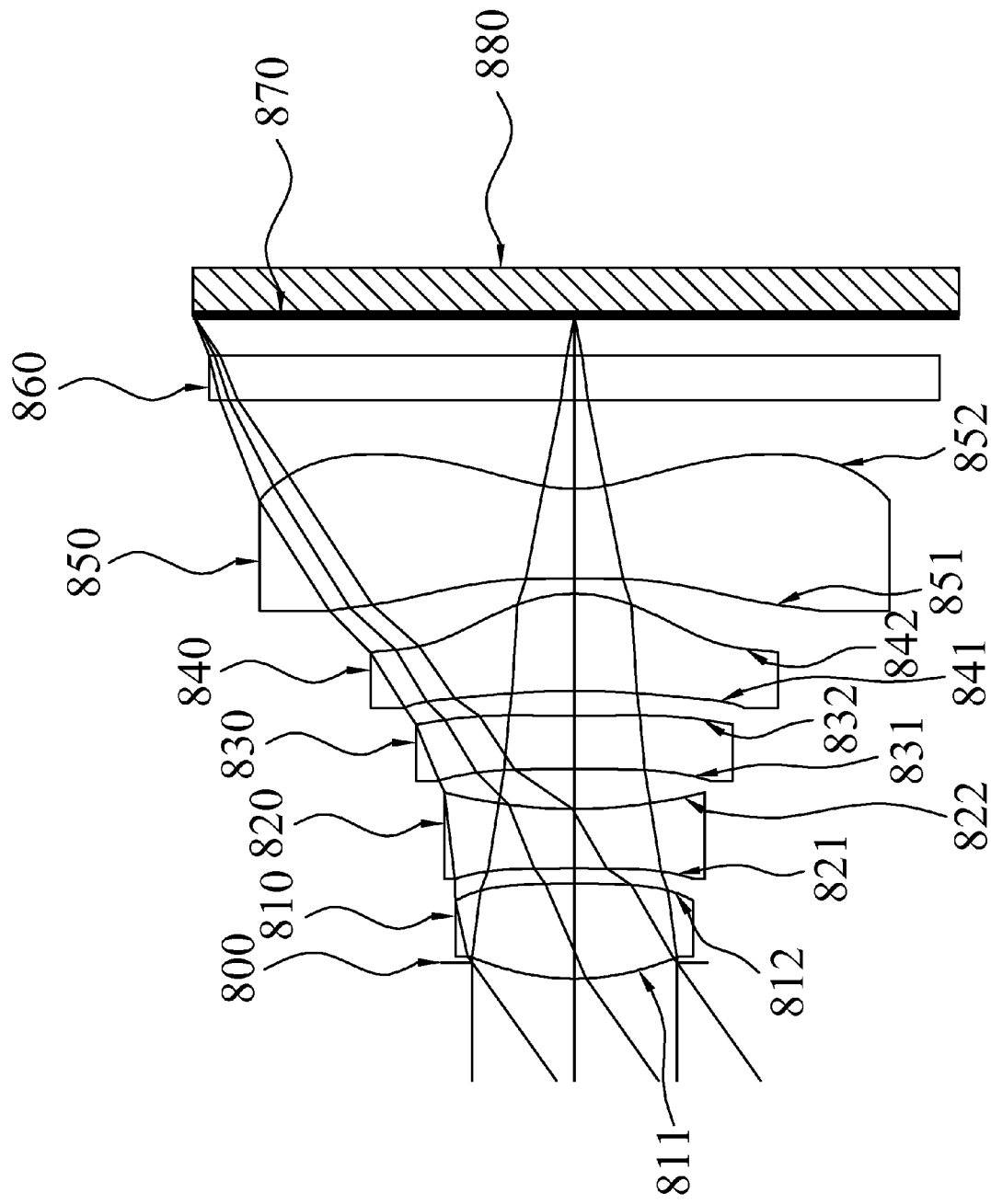
FIG. 8A is a schematic view of an optical lens assembly for imaging pickup in accordance with the eighth preferred embodiment of the present invention.
Figure 8B:
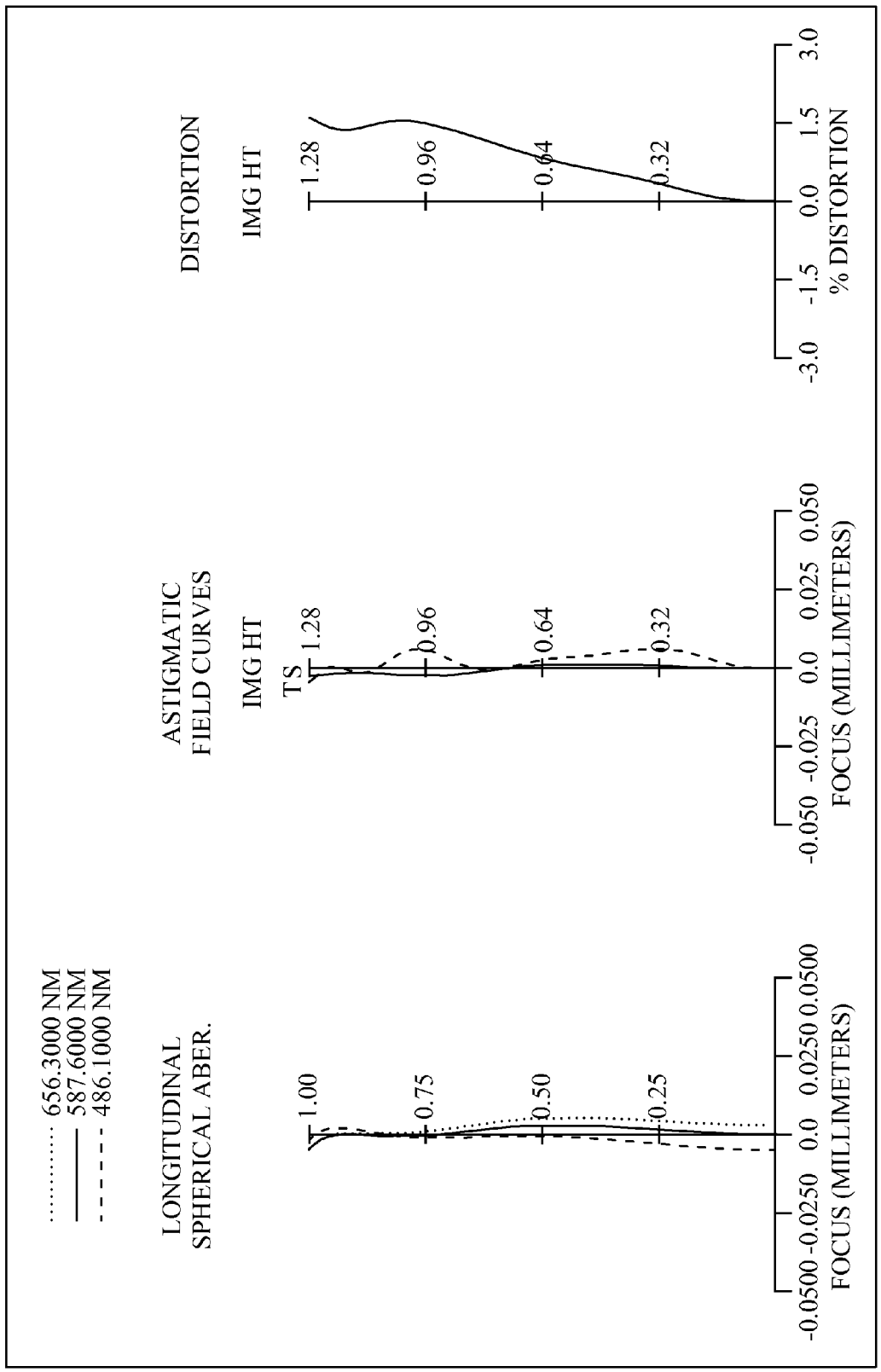
FIG. 8B is a schematic view of a series of aberration curves of the eighth preferred embodiment of the present invention.
Figure 9:
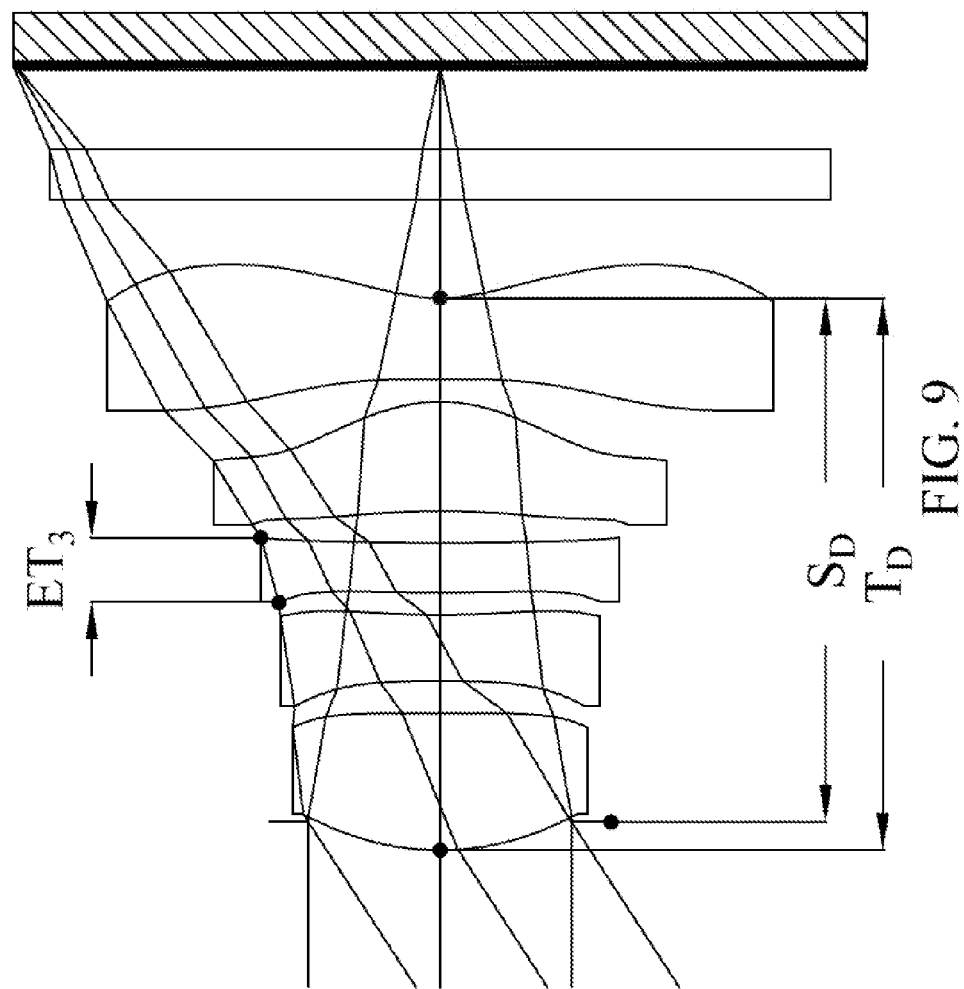
FIG. 9 is a schematic view of $T_D$ and $ET_3$ of the present invention.

With reference to FIGS. 8A and 8B for a schematic view and a series of aberration curves of an optical lens assembly for imaging pickup in accordance with the eighth preferred embodiment of the present invention respectively, the optical lens assembly for imaging pickup comprises five lens elements, an aperture stop 800 and an IR-filter 860. More specifically, the optical lens assembly for imaging pickup, sequentially arranged from an object side to an image side along an optical axis, comprises: an aperture stop 800; a plastic first lens element 810 with positive refractive power has a convex object-side surface 811 and a convex image-side surface 812, and both object-side surface 811 and image-side surface 812 are aspheric; a plastic second lens element 820 with negative refractive power has a concave object-side surface 821 and a concave image-side surface 822, and both object-side surface 821 and image-side surface 822 are aspheric; a plastic third lens element 830 with negative refractive power has a concave object-side surface 831 and a concave image-side surface 832, and both object-side surface 831 and image-side surface 832 are aspheric; a plastic fourth lens element 840 with positive refractive power has a concave object-side surface 841 and a convex image-side surface 842, and both object-side surface 841 and image-side surface 842 are aspheric; a plastic fifth lens element 850 with negative refractive power has a concave object-side surface 851 and a concave image-side surface 852, and both object-side surface 851 and image-side surface 852 are aspheric and having at least one inflection point; and an IR-filter 860 made of panel glass for adjusting a wavelength section of the light of an image, and an image sensor 880 at an image plane 870. With the combination of the five lens elements, the aperture stop 800 and the IR-filter 860, an image of the photographed object can be formed at the image sensor 880.

TABLE 22

Optical data of the eighth preferred embodiment f = 1.78 mm, Fno = 2.58, HFOV = 35.4 deg.

| Surface # | Curvature Radius | Thickness | Material | Index | Abbe # | Focal length |
|---|---|---|---|---|---|---|
| 0 | Object | Plano | Infinity | | | |
| 1 | Ape. Stop | Plano | −0.055 | | | |
| 2 | 0.819690 (ASP) | 0.322 | | | | |
| | Lens 1 | | Plastic | 1.544 | 55.9 | 1.29 |
| 3 | −4.301800 (ASP) | 0.051 | | | | |
| 4 | −19.741200 (ASP) | 0.200 | | | | |
| | Lens 2 | | Plastic | 1.640 | 23.3 | −2.31 |
| 5 | 1.607420 (ASP) | 0.135 | | | | |
| 6 | −41.666700 (ASP) | 0.180 | | | | |
| | Lens 3 | | Plastic | 1.544 | 55.9 | −14.56 |
| 7 | 9.794300 (ASP) | 0.084 | | | | |
| 8 | −2.602950 (ASP) | 0.328 | | | | |
| | Lens 4 | | Plastic | 1.544 | 55.9 | 0.97 |
| 9 | −0.456680 (ASP) | 0.052 | | | | |
| 10 | −9.345800 (ASP) | 0.302 | | | | |
| | Lens 5 | | Plastic | 1.544 | 55.9 | −0.88 |
| 11 | 0.509330 (ASP) | 0.300 | | | | |
| 12 | Plano | 0.150 | | | | |
| | IR-filter | | Glass | 1.517 | 64.2 | — |
| 13 | Plano | 0.137 | | | | |
| 14 | Image | Plano | — | | | |

Note:
Reference wavelength is 587.6 nm.
ASP stands for aspherical surfaces.

The optical data of this preferred embodiment are listed in Table 22, wherein the object-side surface and the image-side surface of the first lens element 810 to the fifth lens element 850 comply with the aspheric surface formula as given in Equation (14), and their aspheric coefficients are listed in Table 23 as follows:

TABLE 23

Aspheric coefficients of the eighth preferred embodiment

| Surface # | 2 | 3 | 4 | 5 | 6 |
|---|---|---|---|---|---|
| k = | −8.56088E−01 | −2.98357E+00 | −9.00000E+01 | 1.00000E+00 | −1.00000E+00 |
| A4 = | 8.36381E−02 | −8.14247E−01 | −9.45574E−01 | −1.67166E−01 | −8.85519E−01 |
| A6 = | −1.16490E+00 | −6.72879E+00 | −4.45859E+00 | −1.82992E+00 | −7.67036E−01 |
| A8 = | 3.81952E+00 | 2.33087E+01 | 6.26199E+00 | 1.24372E+01 | 6.31630E+00 |
| A10 = | −8.76283E+01 | −9.84435E+01 | 7.21687E+01 | −2.15819E+01 | −4.68362E+00 |
| A12 = | −2.53399E+00 | 1.56329E+02 | 4.80669E+00 | 4.78919E+01 | −1.56873E+01 |

| Surface # | 7 | 8 | 9 | 10 | 11 |
|---|---|---|---|---|---|
| k = | −2.46493E+00 | 1.80048E+01 | −2.95795E+00 | −9.00000E+01 | −6.15244E+00 |
| A4 = | −6.29073E−01 | 2.51642E−01 | −4.46310E−01 | −1.77114E+00 | −1.19397E+00 |
| A6 = | −5.39209E−01 | −7.00428E−01 | 1.36385E+00 | 7.61051E+00 | 3.68314E+00 |
| A8 = | −1.53076E−01 | 4.19249E+01 | 1.84093E+01 | −1.80830E+01 | −8.42979E+00 |
| A10 = | 5.75679E+00 | −3.89287E+02 | −4.66376E+01 | 2.80449E+01 | 1.27384E+01 |
| A12 = | 2.07130E+01 | 1.70638E+03 | −3.13360E+01 | −2.74345E+01 | −1.21457E+01 |
| A14 = |  | −3.77773E+03 | 1.78128E+02 | 1.54190E+01 | 6.48510E+00 |
| A16 = |  | 3.34556E+03 | −1.36712E+02 | −4.10329E+00 | −1.46883E+00 |

With reference to Table 22 and FIG. 8B for an optical lens assembly for imaging pickup of this preferred embodiment, the optical lens assembly for imaging pickup has a focal length f=1.78 (mm), an f-number Fno=2.58, and a half of the maximum view angle HFOV=35.4°. After the optical data of this preferred embodiment are calculated and derived, the optical imaging system for pickup satisfies related conditions as shown in Table 24 below, and the related symbols have been described above and thus will not be described again.

TABLE 24

Data of related relations of the eighth preferred embodiment

| Relation | Data |
|---|---|
| $v_1 - v_2$ | 32.6 |
| $(CT_2 + CT_3)$ [mm] | 0.38 |
| $CT_{min}$ [mm] | 0.18 |
| $CT_{max}$ [mm] | 0.33 |
| $CT_{min}/CT_{max}$ | 0.55 |
| $\Sigma CT$ [mm] | 1.33 |
| $ET_3$ [mm] | 0.19 |
| $T_D$ [mm] | 1.65 |
| $(TTL/f)*T_D$ [mm] | 2.04 |
| $|f/f_3|$ | 0.12 |
| $f_4/f$ | 0.54 |
| $f_5/f$ | −0.49 |
| $S_D/T_D$ | 0.97 |

According to the optical data as shown in Table 22 and the series of aberration curves as shown in FIG. 8B, the optical lens assembly for imaging pickup in accordance with this preferred embodiment of the present invention provides good correction results in aspects of the longitudinal spherical aberration, astigmatic field curving, and distortion.

In the optical lens assembly for imaging pickup of the present invention, the aperture stop can be a front or middle aperture stop. If the aperture stop is a front aperture stop, a longer distance between the exit pupil of the optical lens assembly for imaging pickup and the image plane can provide the telecentric effect and improve the efficiency of receiving images by the image sensor such as a CCD or CMOS image sensor. If the aperture stop is a middle aperture stop positioned between the first lens element and the image plane, the view angle of the system can be increased, such that the optical lens assembly for imaging pickup has the advantage of a wide-angle lens.

In the optical lens assembly for imaging pickup of the present invention, the lens element can be made of glass or plastic. For the lens elements made of glass, the allocation of refractive power of the optical lens assembly for imaging pickup can have higher degree of freedom in selecting design parameters. For the lens elements made of plastic, the production cost can be lowered effectively as well as the advantages of aspheric lens production can be obtained.

In the optical lens assembly for imaging pickup of the present invention, if the lens element has a convex surface, then the surface of the lens element is convex at a position in proximity to the axis; and if the lens element has a concave surface, then the surface of the lens element is concave at a position in proximity to the axis.

In the optical lens assembly for imaging pickup of the present invention, at least one stop such as a glare stop or a field stop can be provided for reducing stray lights to improve the image quality, to limit the field size, or other functionalities.

Tables 1 to 24 show value changes of an optical lens assembly for imaging pickup in accordance with different preferred embodiments of the present invention respectively, and even if different values are used, products of the same structure are intended to be covered by the scope of the present invention. It is noteworthy to point out that the aforementioned description and the illustration of related drawings are provided for the purpose of explaining the technical characteristics of the present invention, but not intended for limiting the scope of the present invention.

What is claimed is:

1. An optical lens assembly for imaging pickup, sequentially arranged from an object side to an image side, comprising:
    a first lens element with positive refractive power, having a convex object-side surface;
    a second lens element with negative refractive power;
    a third lens element with refractive power, made of plastic, and having both object-side surface and image-side surface being aspheric;

a fourth lens element with positive refractive power, made of plastic, having a concave object-side surface and a convex image-side surface, and both object-side surface and image-side surface being aspheric; and a fifth lens element with negative refractive power, made of plastic, having a concave image-side surface, both object-side surface and image-side surface being aspheric, and at least one of the object-side surface and image-side surface having at least one inflection point;

wherein, $T_D$ is an axial distance between the object-side surface of the first lens element and the image-side surface of the fifth lens element, and the following relation is satisfied:

1.35 mm<$T_D$<1.85 mm.

2. The optical lens assembly for imaging pickup of claim 1, further comprising a stop; wherein the second lens element has a concave image-side surface; $S_D$ is an axial distance between the stop and the image-side surface of the fifth lens element, $T_D$ is the axial distance between the object-side surface of the first lens element and the image-side surface of the fifth lens element, and the following relation is satisfied:

0.85<$S_D/T_D$<1.15.

3. The optical lens assembly for imaging pickup of claim 1, wherein $v_1$ is an Abbe number of the first lens element, $v_2$ is an Abbe number of the second lens element, and the following relation is satisfied:

30<$v_1-v_2$<42.

4. The optical lens assembly for imaging pickup of claim 2, wherein f is a focal length of the optical lens assembly for imaging pickup, $f_3$ is a focal length of the third lens element, and the following relation is satisfied:

$|f/f_3|$<0.3.

5. The optical lens assembly for imaging pickup of claim 2, wherein f is a focal length of the optical lens assembly for imaging pickup, $f_4$ is a focal length of the fourth lens element, $f_5$ is a focal length of the fifth lens element, and the following relations are satisfied:

0.2<$f_4/f$<0.65; and

−0.65<$f_5/f$<−0.2.

6. The optical lens assembly for imaging pickup of claim 2, wherein $ET_3$ is an edge thickness of the third lens element at the maximum effective diameter, and the following relation is satisfied:

0.15 mm<$ET_3$<0.25 mm.

7. An optical lens assembly for imaging pickup, sequentially arranged from an object side to an image side, comprising:

a first lens element with positive refractive power, having a convex object-side surface;

a second lens element with negative refractive power;

a third lens element with refractive power, made of plastic, and having both object-side surface and image-side surface being aspheric;

a fourth lens element with positive refractive power, made of plastic, and having a concave object-side surface and a convex image-side surface, and both object-side surface and image-side surface being aspheric; and a fifth lens element with negative refractive power, made of plastic, and having a concave image-side surface, both object-side surface and image-side surface being aspheric, and at least one of the object-side surface and image-side surface having at least one inflection point;

wherein, $CT_{max}$ is a central thickness of the thickest lens element of the optical lens assembly for imaging pickup, $CT_{min}$ is a central thickness of the thinnest lens element of the optical lens assembly for imaging pickup, and the following relations are satisfied:

0.25 mm<$CT_{max}$<0.6 mm; and 0.14 mm<$CT_{min}$<0.25 mm.

8. The optical lens assembly for imaging pickup of claim 7, wherein f is a focal length of the optical lens assembly for imaging pickup, $f_4$ is a focal length of the fourth lens element, $f_5$ is a focal length of the fifth lens element, and the following relations are satisfied:

0.2<$f_4/f$<0.65; and

−0.65<$f_5/f$<−0.2.

9. The optical lens assembly for imaging pickup of claim 7, wherein $v_1$ is an Abbe number of the first lens element, $v_2$ is an Abbe number of the second lens element and the following relation is satisfied:

30<$v_1-v_2$<42.

10. The optical lens assembly for imaging pickup of claim 7, further comprising a stop; $S_D$ is an axial distance between the stop and the image-side surface of the fifth lens element, $T_D$ is an axial distance between the object-side surface of the first lens element and the image-side surface of the fifth lens element, $CT_{max}$ is the central thickness of the thickest lens element of the optical lens assembly for imaging pickup, and $CT_{min}$ is the central thickness of the thinnest lens element of the optical lens assembly for imaging pickup, and the following relations are satisfied:

0.85<$S_D/T_D$<1.15; and 0.45<$CT_{min}/CT_{max}$<0.95.

11. The optical lens assembly for imaging pickup of claim 7, wherein $ET_3$ is an edge thickness of the third lens element at the maximum effective diameter, and the following relation is satisfied:

0.15 mm<$ET_3$<0.25 mm.

12. The optical lens assembly for imaging pickup of claim 7, further comprising an image plane, wherein TTL is an axial distance between the object-side surface of the first lens element and the image plane, f is a focal length of the optical lens assembly for imaging pickup, $T_D$ is an axial distance between the object-side surface of the first lens element and the image-side surface of the fifth lens element, and the following relation is satisfied:

1.7 mm<$(TTL/f)*T_D$<2.8 mm.

13. An optical lens assembly for imaging pickup, sequentially arranged from an object side to an image side, comprising:

a first lens element with positive refractive power, having a convex object-side surface;

a second lens element with negative refractive power;

a third lens element with refractive power, made of plastic, and having both object-side surface and image-side surface being aspheric;

a fourth lens element with positive refractive power, made of plastic, and having a concave object-side surface and a convex image-side surface, and both object-side surface and image-side surface being aspheric; and a fifth lens element with negative refractive power, made of plastic, and having a concave image-side surface, both object-side surface and image-side surface being aspheric, and at least one of the object-side surface and the image-side surface having at least one inflection point;

wherein $CT_2$ is a central thickness of the second lens element, $CT_3$ is a central thickness of the third lens element, $\Sigma CT$ is a summation of central thickness of each lens element of the optical lens assembly for imaging pickup, and the following relations are satisfied:

0.3 mm<($CT_2$+$CT_3$)<0.55 mm; and 1.15 mm<$\Sigma CT$<1.65 mm.

14. The optical lens assembly for imaging pickup of claim 13, further comprising a stop, wherein the second lens element has a concave image-side surface; $S_D$ is an axial distance between the stop and the image-side surface of the fifth lens element, $T_D$ is an axial distance between the object-side surface of the first lens element and the image-side surface of the fifth lens element, and the following relation is satisfied:

0.85<$S_D/T_D$<1.15.

15. The optical lens assembly for imaging pickup of claim 13, wherein f is a focal length of the optical lens assembly for imaging pickup, $f_4$ is a focal length of the fourth lens element, $f_5$ is a focal length of the fifth lens element, and the following relations are satisfied:

0.2<$f_4/f$<0.65; and

−0.65<$f_5/f$<−0.2.

16. The optical lens assembly for imaging pickup of claim 13, wherein $v_1$ is an Abbe number of the first lens element, $v_2$ is an Abbe number of the second lens element, and the following relation is satisfied:

30<$v_1-v_2$<42.

17. The optical lens assembly for imaging pickup of claim 13, wherein f is a focal length of the optical lens assembly for imaging pickup, $f_3$ is a focal length of the third lens element, and the following relation is satisfied:

$|f/f_3|$<0.3.

18. The optical lens assembly for imaging pickup of claim 13, wherein $ET_3$ is an edge thickness of the third lens element at the maximum effective diameter, and the following relation is satisfied:

0.15 mm<$ET_3$<0.25 mm.

19. An optical lens assembly for imaging pickup, sequentially arranged from an object side to an image side, comprising:

a first lens element with positive refractive power;
a second lens element with negative refractive power;
a third lens element with refractive power, made of plastic, and having both object-side surface and image-side surface being aspheric;

a fourth lens element with positive refractive power, made of plastic, and having a concave object-side surface and a convex image-side surface, and both object-side surface and image-side surface being aspheric; and a fifth lens element with negative refractive power, made of plastic, and having both object-side surface and image-side surface being aspheric, and at least one of the object-side surface and image-side surface having at least one inflection point;

wherein further comprising an image plane; TTL is an axial distance between the object-side surface of the first lens element and the image plane, f is a focal length of the optical lens assembly for imaging pickup, $T_D$ is an axial distance between the object-side surface of the first lens element and the image-side surface of the fifth lens element, and the following relation is satisfied:

1.7 mm<$(TTL/f)*T_D$<2.8 mm.

20. The optical lens assembly for imaging pickup of claim 19, further comprising a stop; wherein the second lens element has a concave image-side surface; $S_D$ is an axial distance between the stop and the image-side surface of the fifth lens element, $T_D$ is the axial distance between the object-side surface of the first lens element and the image-side surface of the fifth lens element, and the following relation is satisfied:

0.85<$S_D/T_D$<1.15.

21. The optical lens assembly for imaging pickup of claim 20, wherein f is the focal length of the optical lens assembly for imaging pickup, $f_3$ is a focal length of the third lens element, and the following relation is satisfied:

$|f/f_3|$<0.3.

22. The optical lens assembly for imaging pickup of claim 20, wherein f is the focal length of the optical lens assembly for imaging pickup, $f_4$ is a focal length of the fourth lens element, $f_5$ is a focal length of the fifth lens element, and the following relations are satisfied:

0.2<$f_4/f$<0.65; and

−0.65<$f_5/f$<−0.2.

23. The optical lens assembly for imaging pickup of claim 20, wherein $CT_{max}$ is a central thickness of the thickest lens element of the optical lens assembly for imaging pickup, and $CT_{min}$ is a central thickness of the thinnest lens element of the optical lens assembly for imaging pickup, and the following relation is satisfied:

0.45<$CT_{min}/CT_{max}$<0.95.

24. The optical lens assembly for imaging pickup of claim 19, wherein $ET_3$ is an edge thickness of the third lens element at the maximum effective diameter, and the following relation is satisfied:

0.15 mm<$ET_3$<0.25 mm.

* * * * *